United States Patent
Kotake et al.

(10) Patent No.: US 11,493,349 B2
(45) Date of Patent: Nov. 8, 2022

(54) INFORMATION PROCESSING APPARATUS, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Kosuke Kotake, Nagoya (JP); Ryosuke Tanimura, Toyota (JP); Yuki Ito, Iwakura (JP); Akira Nishida, Toyota (JP); Zekai Qiu, Nisshin (JP); Kenichi Hagiya, Nagoya (JP); Naoki Yamamuro, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 777 days.

(21) Appl. No.: 16/438,588

(22) Filed: Jun. 12, 2019

(65) Prior Publication Data

US 2019/0376803 A1    Dec. 12, 2019

(30) Foreign Application Priority Data

Jun. 12, 2018 (JP) ............................ JP2018-112042
Nov. 28, 2018 (JP) ............................ JP2018-222836

(51) Int. Cl.
*G06Q 10/02* (2012.01)
*G01C 21/34* (2006.01)
*H04W 64/00* (2009.01)
*G06F 16/909* (2019.01)

(52) U.S. Cl.
CPC ....... *G01C 21/3438* (2013.01); *G06F 16/909* (2019.01); *H04W 64/003* (2013.01); *H04W 64/006* (2013.01)

(58) Field of Classification Search
CPC ... G06F 16/909; G06F 21/6245; G06Q 50/01; G06Q 50/30; G06Q 10/02; G06Q 10/025; G06Q 30/0645; H04L 51/32; H04L 61/1594; H04W 12/02; H04W 4/21; H04W 64/003; H04W 64/006; G01C 21/3438
See application file for complete search history.

(56) References Cited

U.S. PATENT DOCUMENTS

| | | | |
|---|---|---|---|
| 2015/0099550 A1* | 4/2015 | Alharayeri | H04W 4/21 455/456.3 |
| 2017/0093786 A1* | 3/2017 | Baca | G06F 16/9535 |
| 2018/0027070 A1* | 1/2018 | Jhanji | H04W 4/08 709/217 |

FOREIGN PATENT DOCUMENTS

JP    2011-237842 A    11/2011

* cited by examiner

*Primary Examiner* — Quoc Thai N Vu
(74) *Attorney, Agent, or Firm* — Oliff PLC

(57) ABSTRACT

An information processing apparatus according to the present disclosure transmits, upon receiving first information requesting provision of contact information indicating a contact address of a second user, transmitted from a first user terminal which is a terminal used by the first user, second information which is information requesting permission to provide the contact information to the first user and which includes information capable of identifying the first user to a second user terminal which is a terminal used by the second user. The second user is a user who is sharing or has a history of sharing a predetermined space with the first user.

11 Claims, 21 Drawing Sheets

[Fig. 1]
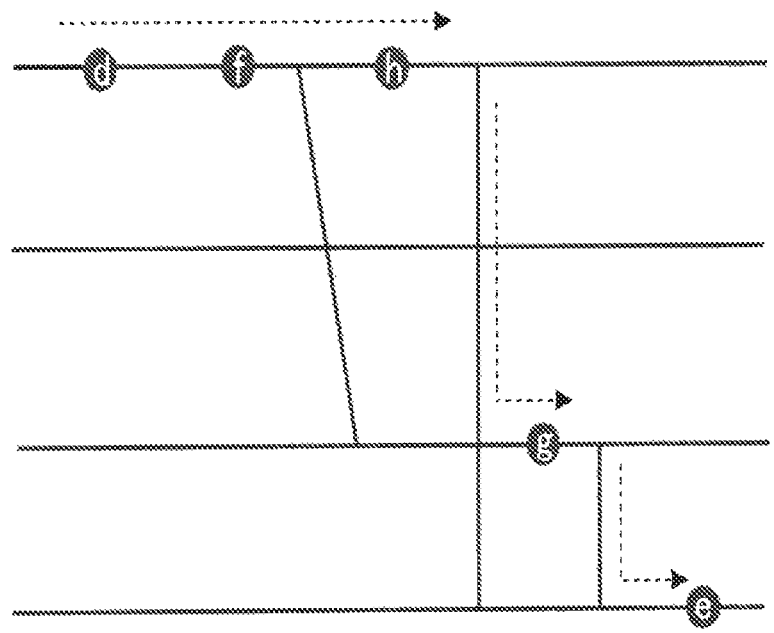

[Fig. 2]
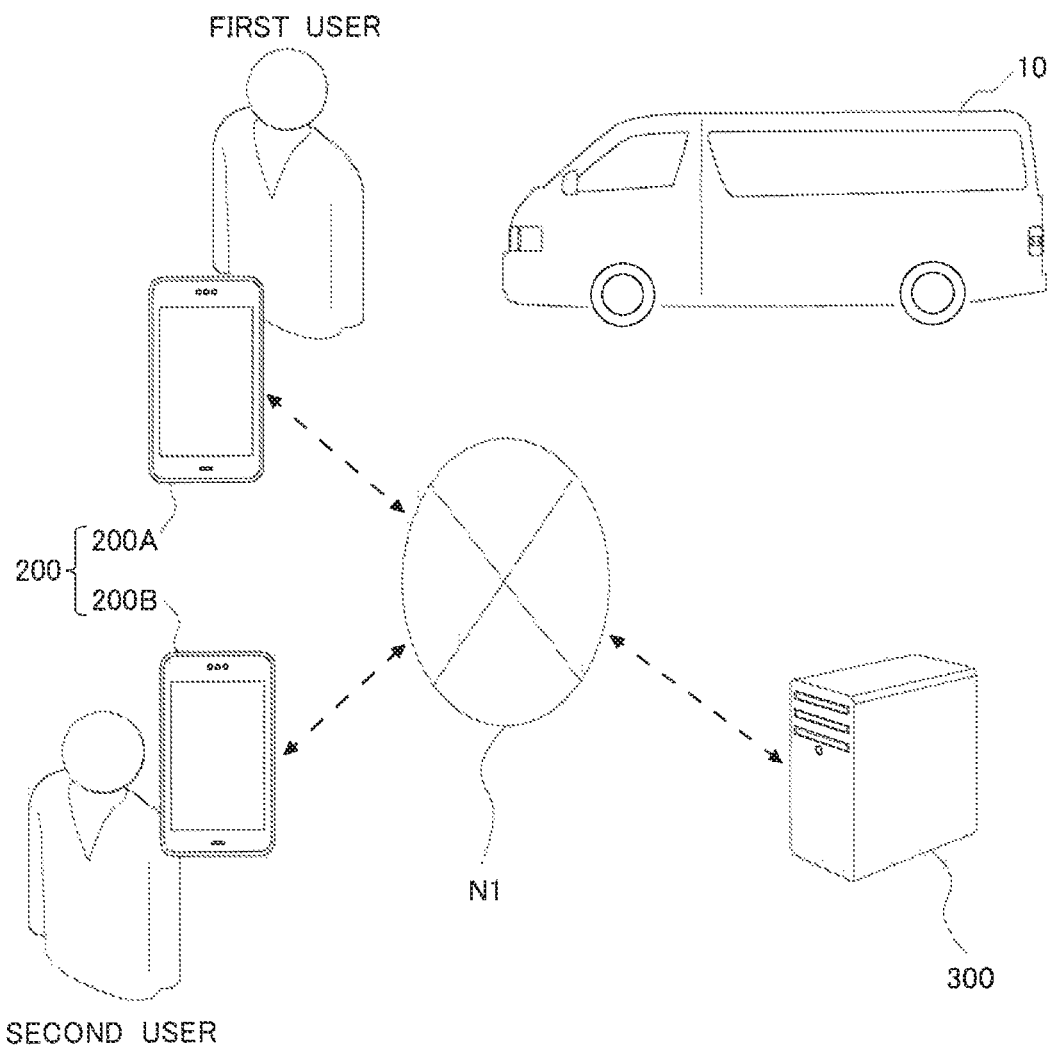

[Fig. 3]
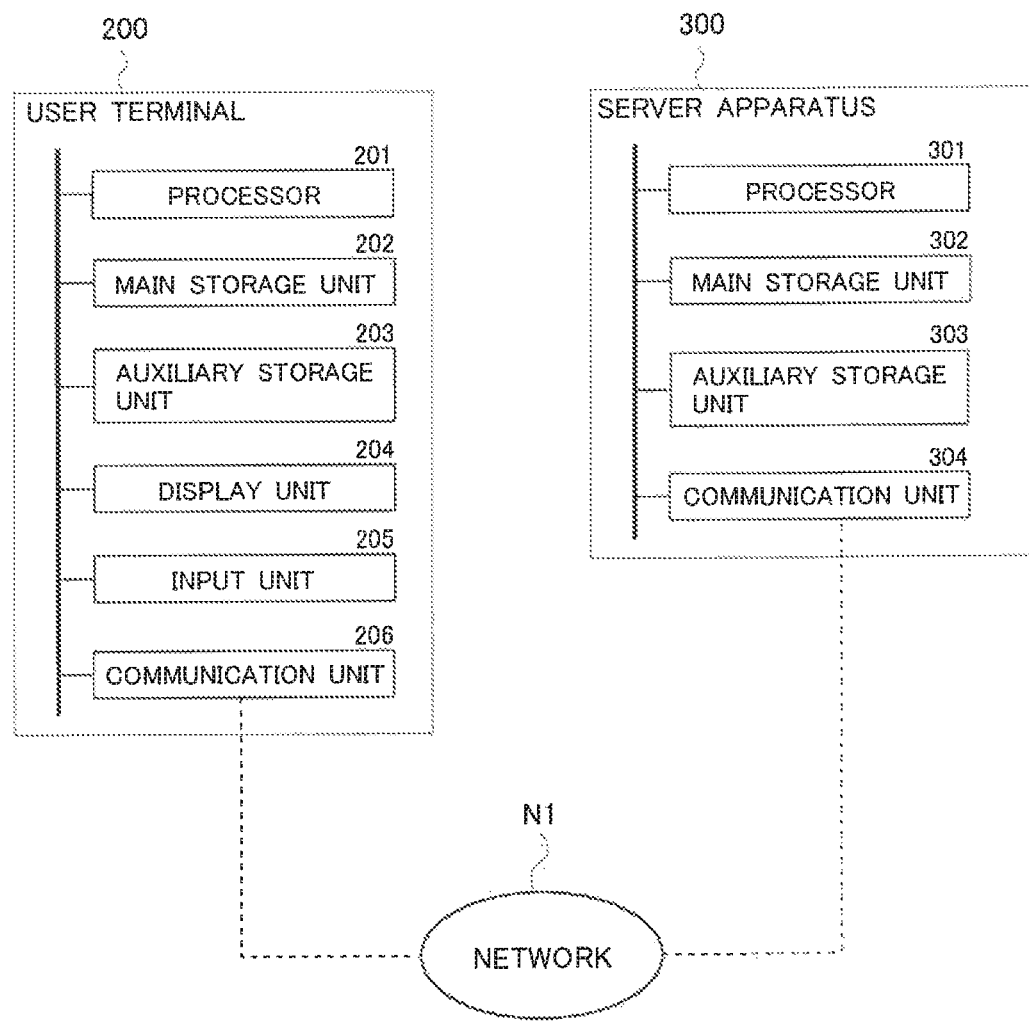

[Fig. 4]
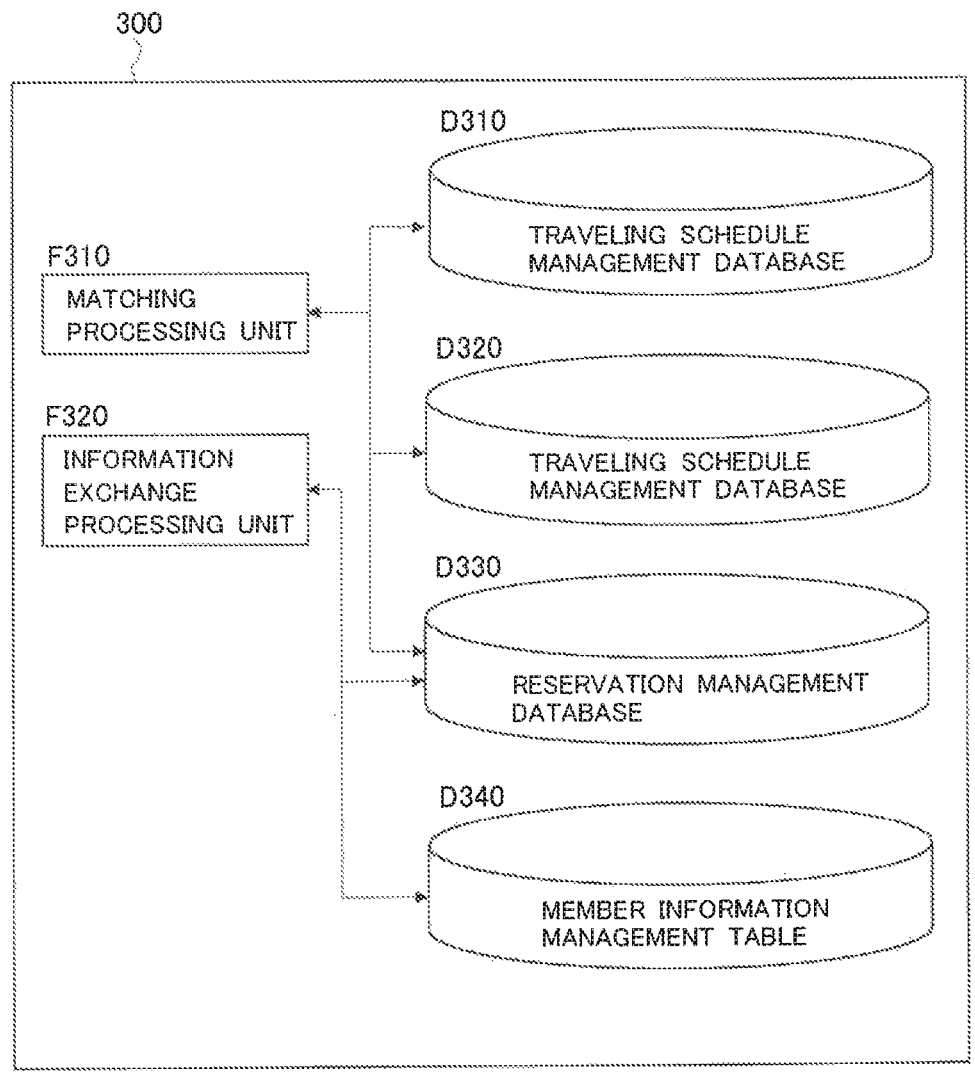

[Fig. 5]

| VEHICLE ID | DRIVING USER ID | PLACE OF DEPARTURE | SCHEDULED DEPARTURE DATE AND TIME | DESTINATION | SCHEDULED ARRIVAL DATE AND TIME | STATUS |
|---|---|---|---|---|---|---|
| S001 | D001 | ... | 2018/11/01/1000 | ... | 2018/11/01/1300 | ALREADY ARRIVED |
| S002 | D002 | ... | 2018/11/05/0800 | ... | 2018/11/05/0900 | TRAVELING |
| S003 | D003 | ... | 2018/11/08/1000 | ... | 2018/11/08/1600 | BEFORE DEPARTURE |

[Fig. 6]

| FELLOW PASSENGER USER ID | GETTING-ON SPOT | DESIRED GETTING-ON DATE AND TIME | GETTING-OFF SPOT | DESIRED GETTING-OFF DATE AND TIME | STATUS |
|---|---|---|---|---|---|
| D010 | ... | 2018/11/01/1030 | ... | 2018/11/01/1230 | GOT OFF |
| D020 | ... | 2018/11/05/0815 | ... | 2018/11/05/0845 | RESERVED |
| D030 | ... | 2018/11/08/1200 | ... | 2018/11/08/1430 | MATCHING IN PROCESS |

[FIG. 7]

| RESERVATION ID | DRIVING USER ID | VEHICLE INFORMATION | FELLOW PASSENGER USER ID | GETTING-ON SPOT | SCHEDULED GETTING-ON DATE AND TIME | GETTING-OFF SPOT | SCHEDULED GETTING-OFF DAY AND TIME | SEAT | STATUS |
|---|---|---|---|---|---|---|---|---|---|
| ... | D001 | ... | D010 | ... | 2018/11/01/1000 | ... | 2018/11/01/1300 | ... | GOT OFF |
| ... | D002 | ... | D020 | ... | 2018/11/05/0800 | ... | 2018/11/05/0900 | ... | ON BOARD |
| ... | D003 | ... | D030 | ... | 2018/11/08/1000 | ... | 2018/11/08/1600 | ... | BEFORE RIDING |

[FIG. 8]

| RESERVATION ID | DRIVING USER ID | VEHICLE INFORMATION | FELLOW PASSENGER USER ID | GETTING-ON SPOT | SCHEDULED GETTING-ON DATE AND TIME | GETTING-OFF SPOT | SCHEDULED GETTING-OFF DAY AND TIME | SEAT | STATUS |
|---|---|---|---|---|---|---|---|---|---|
| ... | D001 | ... | D010 | ... | 2018/11/01/1000 | ... | 2018/11/01/1300 | ... | ON BOARD |
| | | | D020 | ... | 2018/11/01/1030 | ... | 2018/11/01/1230 | ... | GOT OFF |
| | | | D030 | ... | 2018/11/01/1100 | ... | 2018/11/01/1530 | ... | ON BOARD |

[Fig. 9]
| USER ID | CONTACT ADDRESS | ATTRIBUTE | AUTHENTICATION | VEHICLE ID |
|---|---|---|---|---|
| D001 | ... | ... | ... | S001 |
| D002 | ... | ... | ... | S002 |
| D010 | ... | ... | ... | NONE |
[Fig. 10A]
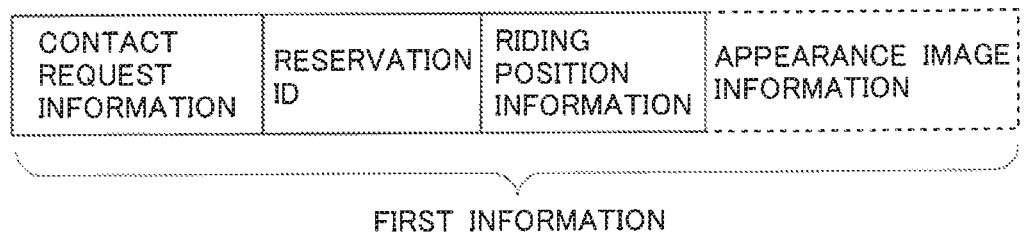
[Fig. 10B]
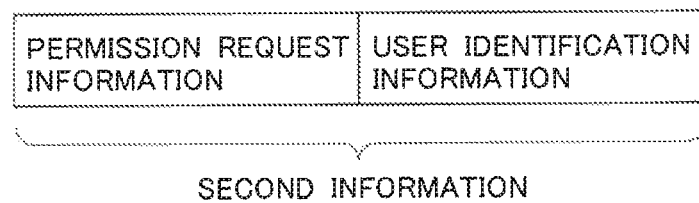
[Fig. 10C]
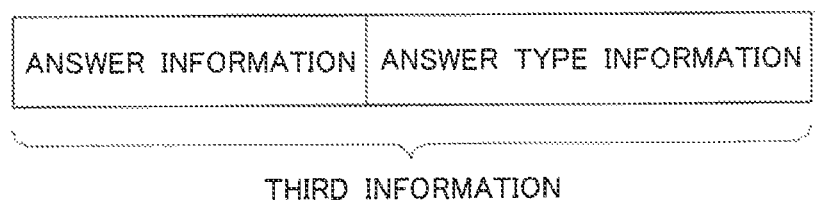

[Fig. 11]
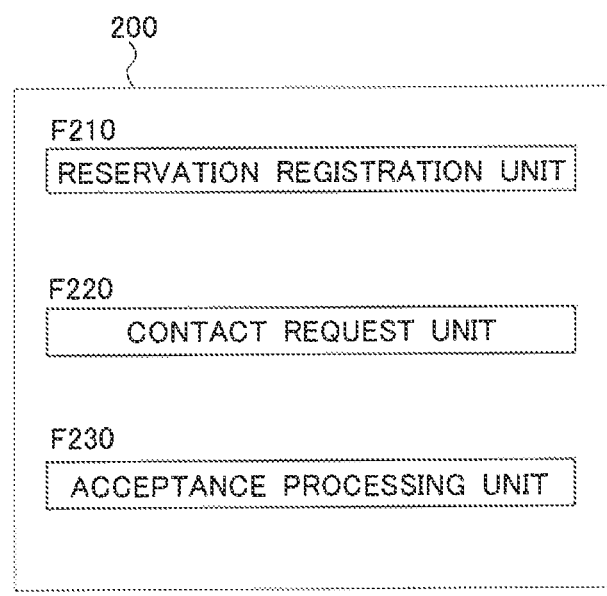

[Fig. 12A]
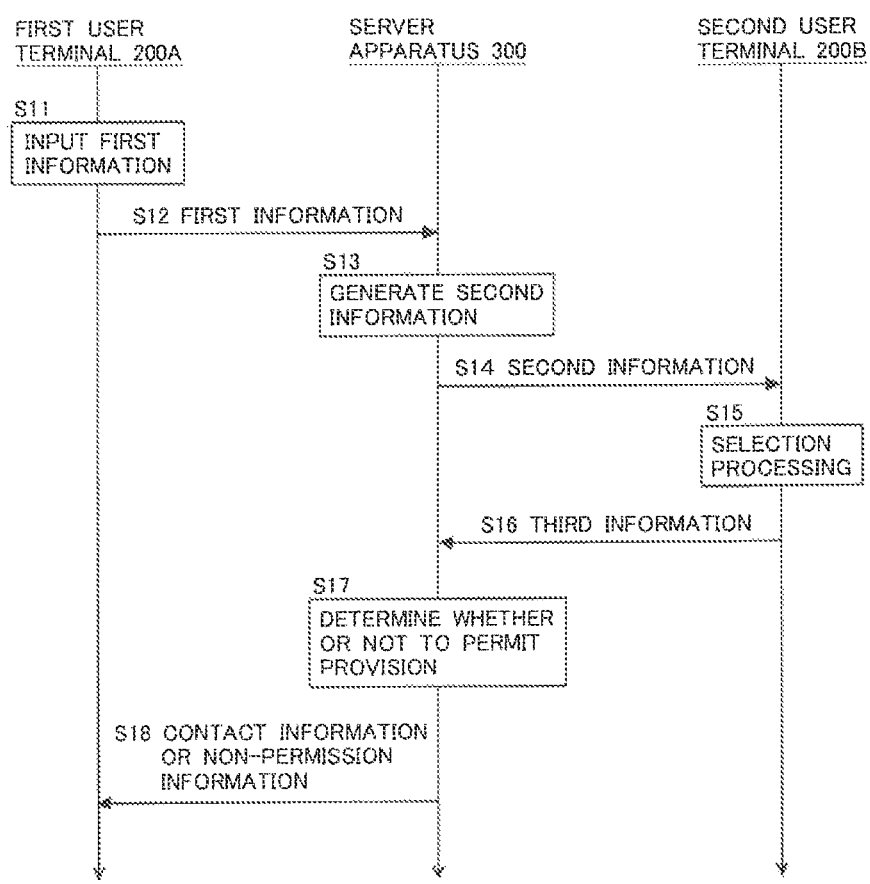

[Fig. 12B]
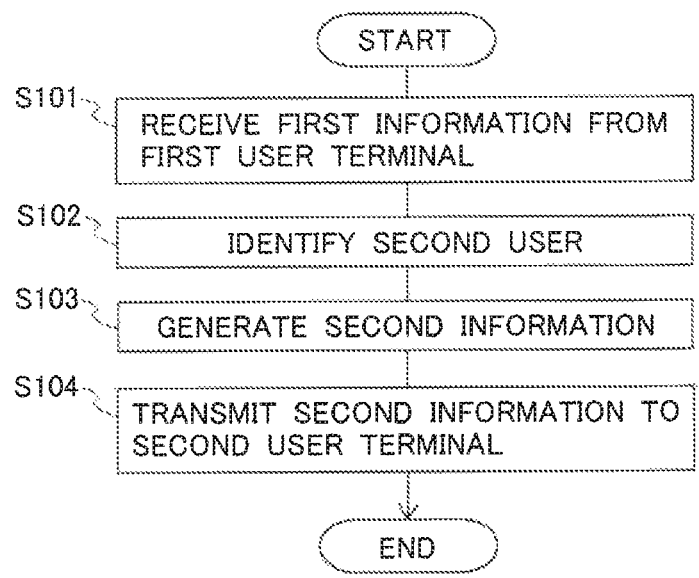

[Fig. 12C]
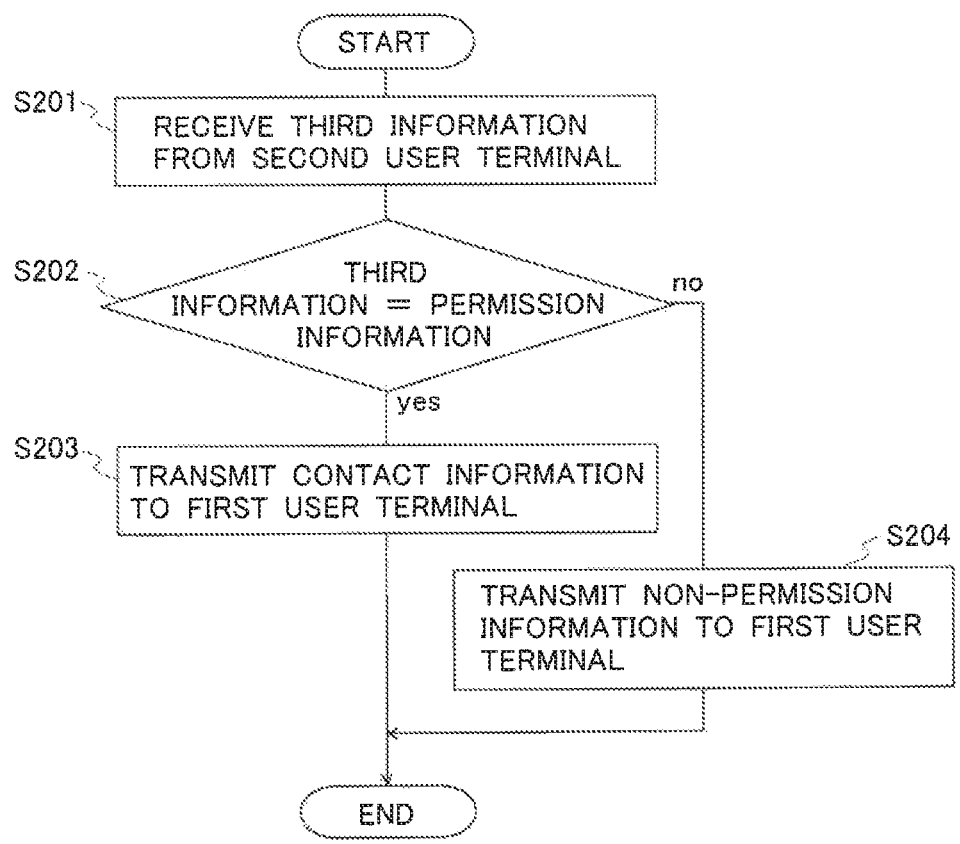

[Fig. 13]
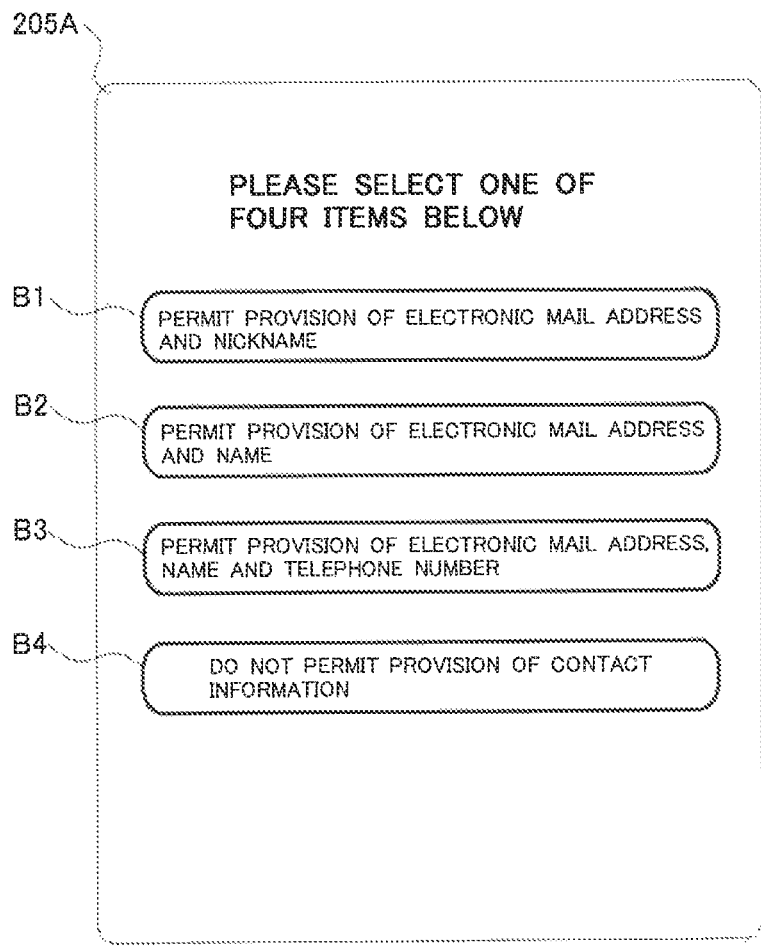
[Fig. 14]
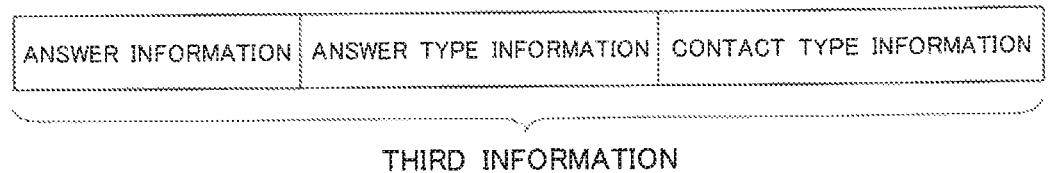

[Fig. 15]
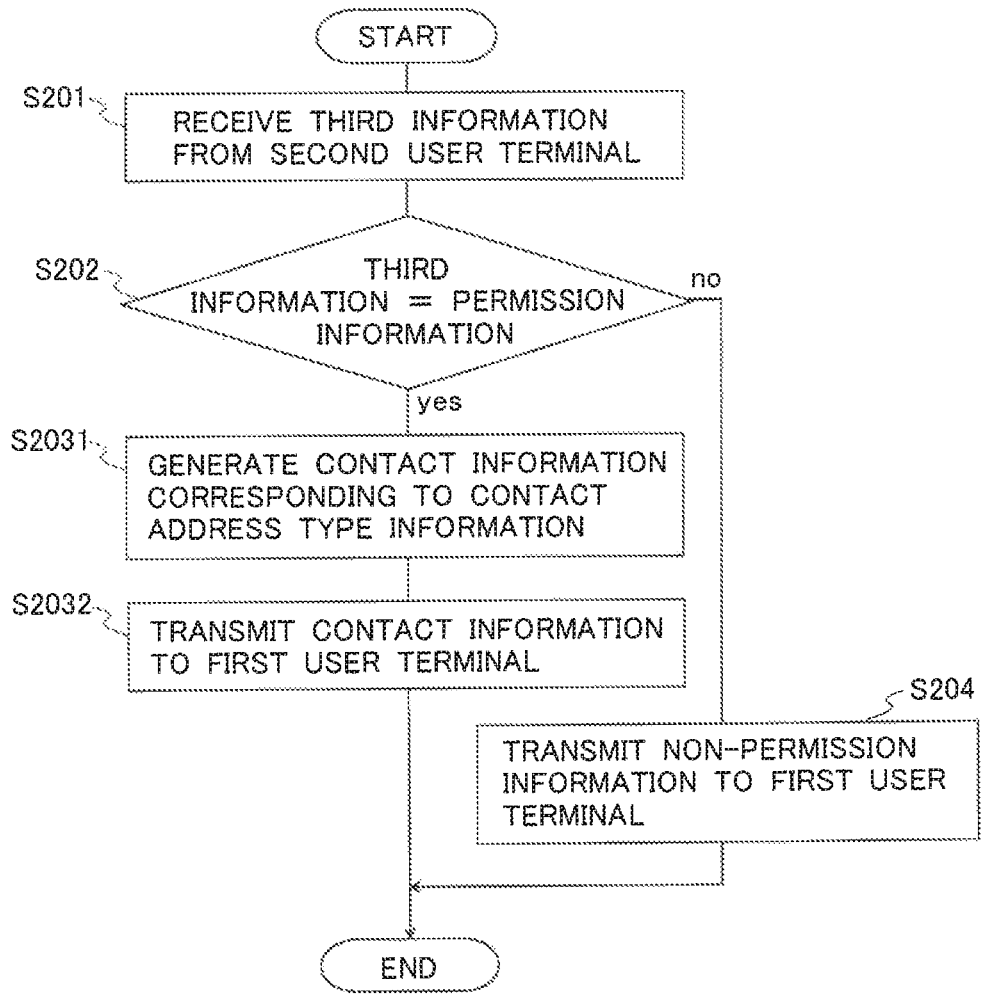
[Fig. 16]
| USER ID | CONTACT ADDRESS | ATTRIBUTE | AUTHENTICATION | VEHICLE ID | EVALUATION |
|---|---|---|---|---|---|
| D001 | ... | ... | ... | S001 | A |
| D002 | ... | ... | ... | S002 | B |
| D010 | ... | ... | ... | NONE | C |

[Fig. 17]
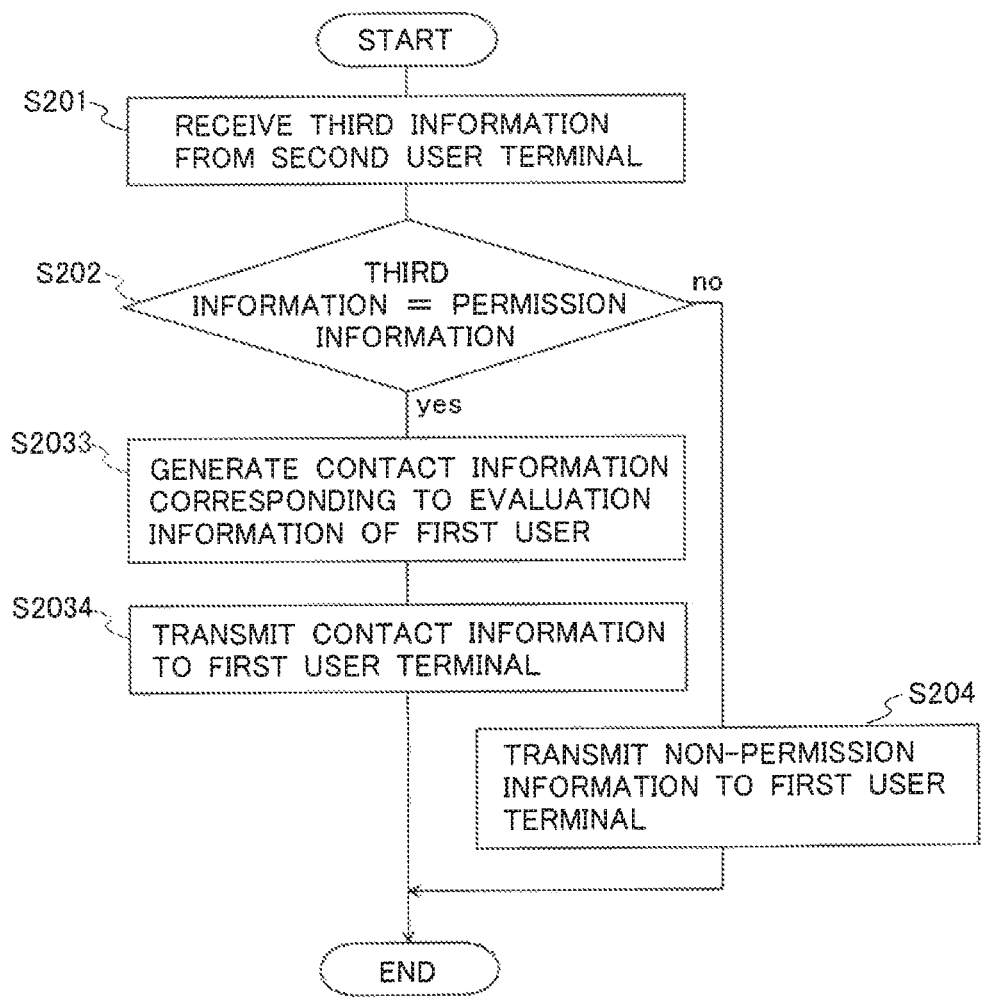

[Fig. 18]
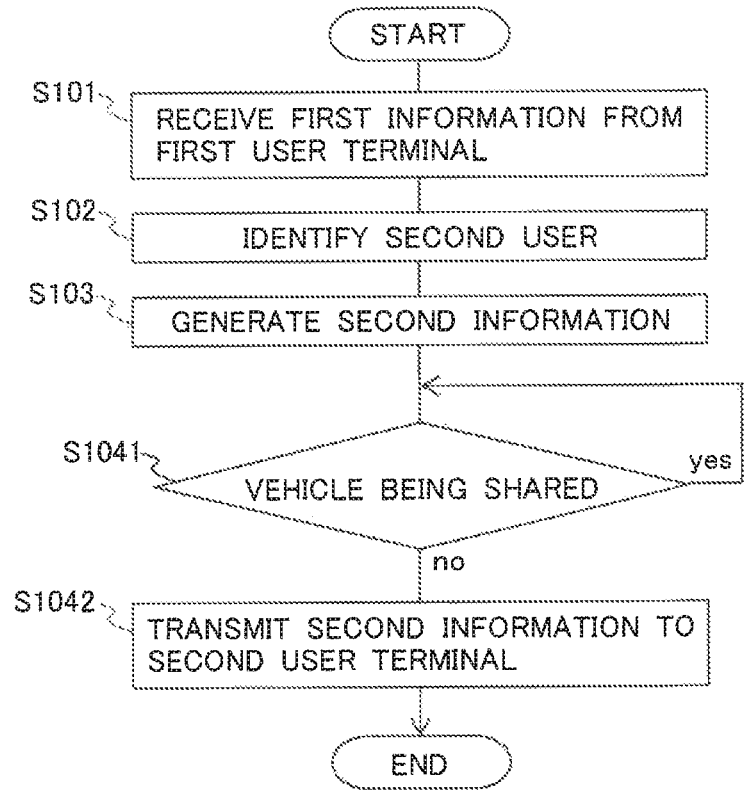
[Fig. 19]
| USER ID | CONTACT ADDRESS | ATTRIBUTE | AUTHENTICATION | VEHICLE ID | NOT PERMITTED USER |
|---|---|---|---|---|---|
| D001 | ... | ... | ... | S001 | D004 |
| D002 | ... | ... | ... | S002 | NONE |
| D010 | ... | ... | ... | NONE | D009, ... |

[Fig. 20]
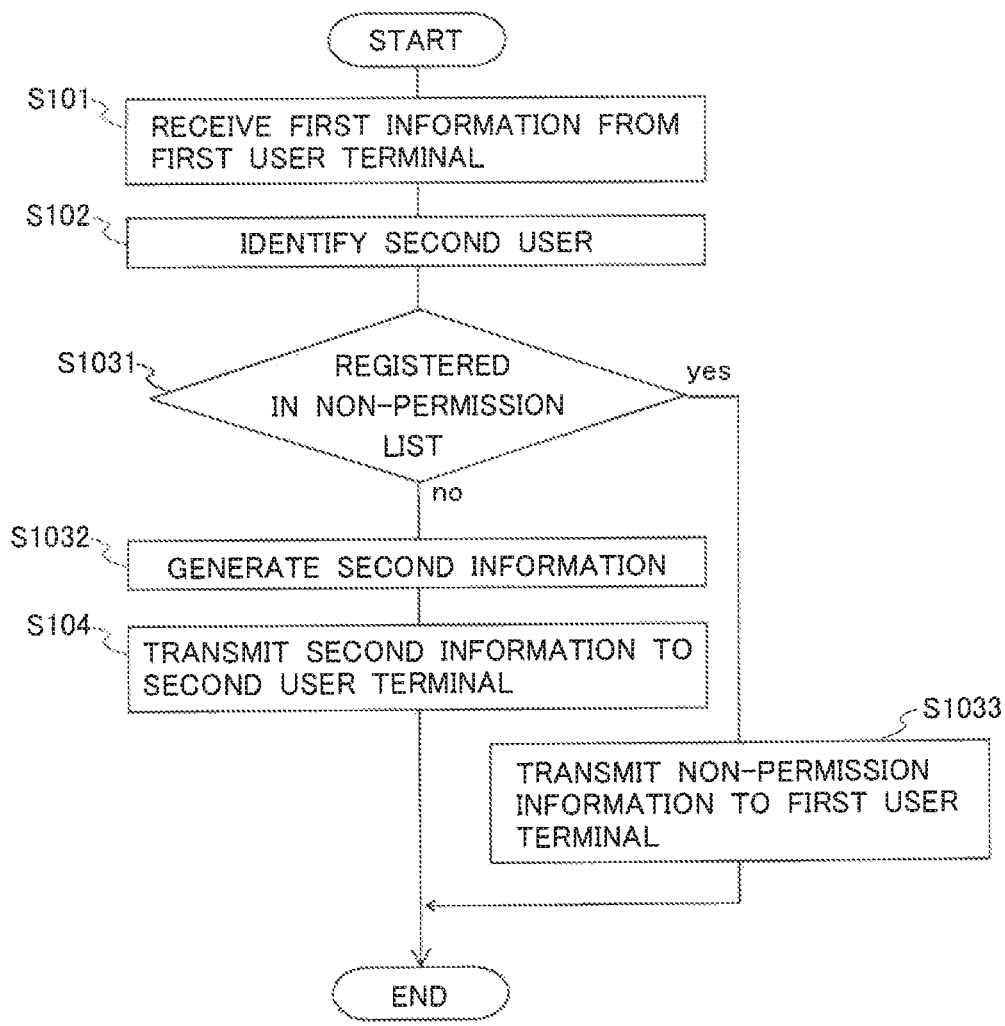

[Fig. 21]
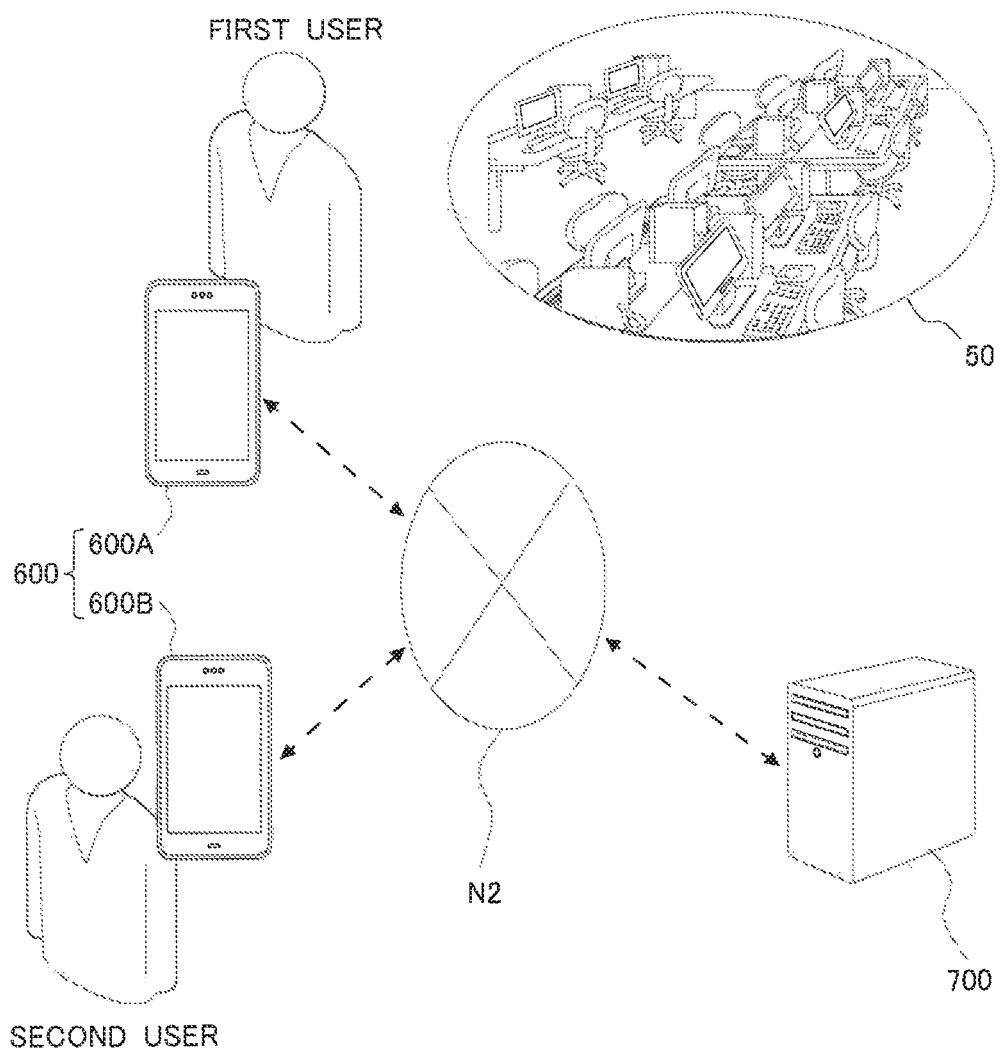

[Fig. 22]
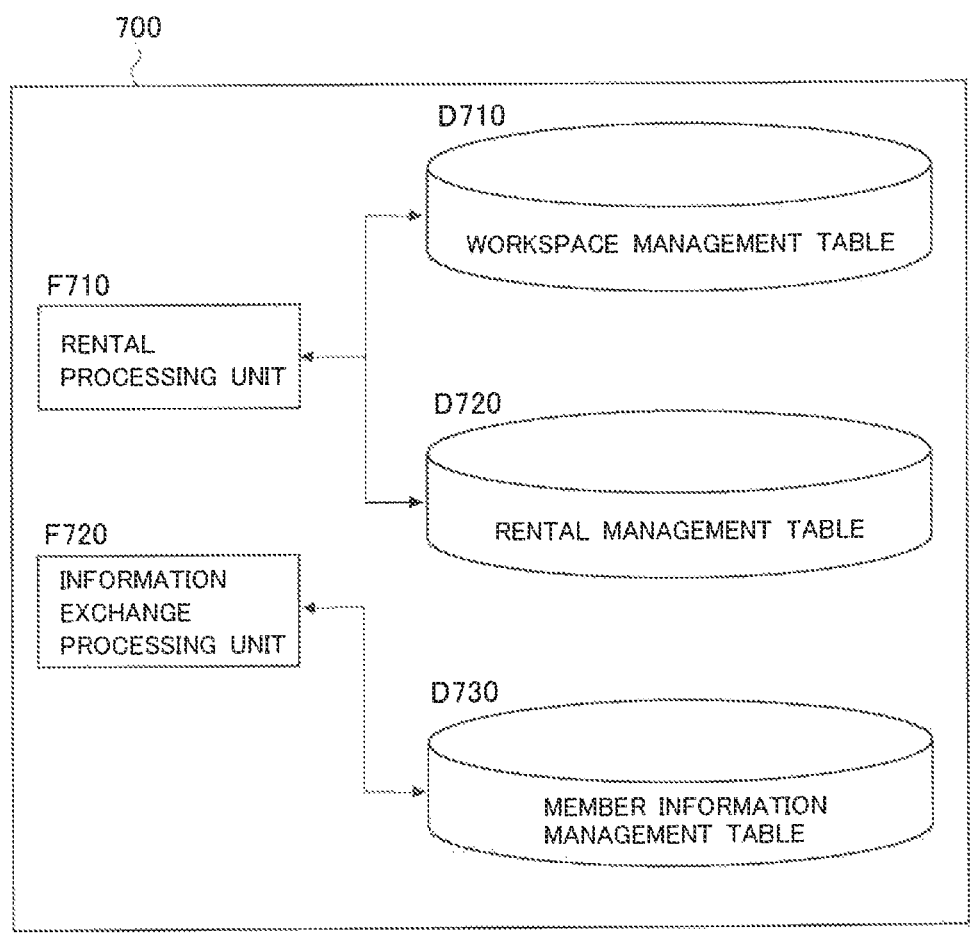
[Fig. 23]
| SPACE ID | LOCATION | RENTABLE PERIOD | STATUS |
|---|---|---|---|
| S001 | ... | 2018/11/01/1800~2018/11/01/2100 | EXPIRED |
| S002 | ... | 2018/11/05/1800~2018/11/05/2100 | BEING RENTED OUT |
| S003 | ... | 2018/11/08/0900~2018/11/08/1700 | BEING RECEIVED |

[Fig. 24]

| RETAL ID | USER ID | SPACE ID | RENTAL PERIOD | USER IDENTIFICATION INFORMATION | STATUS |
|---|---|---|---|---|---|
| ... | D001 | S001 | 2018/11/01/1800~2018/11/01/2100 | ... | EXPIRED |
| ... | D002 | S002 | 2018/11/05/2000~2018/11/05/2100 | ... | BEING RENTED OUT |
| ... | D003 | S003 | 2018/11/08/1300~2018/11/08/1700 | ... | RESERVED |

[Fig. 25]

| USER ID | CONTACT ADDRESS | ATTRIBUTE | AUTHENTICATION |
|---|---|---|---|
| D001 | ... | ... | ... |
| D002 | ... | ... | ... |
| D010 | ... | ... | ... |

[Fig. 26]

| CONTACT REQUEST INFORMATION | RENTAL ID | USER IDENTIFICATION INFORMATION | APPEARANCE IMAGE INFORMATION |
|---|---|---|---|

FIRST INFORMATION

[Fig. 27]
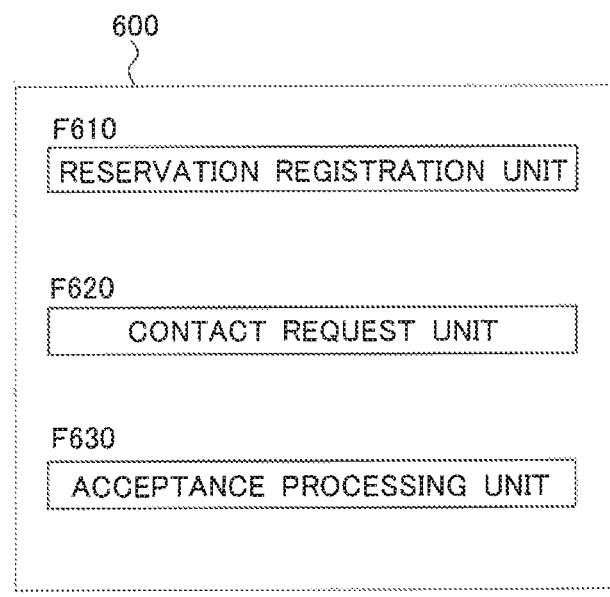

INFORMATION PROCESSING APPARATUS, INFORMATION PROCESSING METHOD, AND NON-TRANSITORY STORAGE MEDIUM

CROSS-REFERENCE TO RELATED APPLICATIONS

This application claims the benefit of Japanese Patent Application No. 2018-112042, filed on Jun. 12, 2018 and Japanese Patent Application No. 2018-222836, filed on Nov. 28, 2018 which are hereby incorporated by reference herein in its entirety.

BACKGROUND

Technical Field

The present disclosure relates to an information processing apparatus, an information processing method, and a non-transitory storage medium.

Description of the Related Art

Techniques for determining whether or not owners of terminals are sharing the same vehicle based on position information of the respective terminals and calculating environment loads such as $CO_2$ emission and fuel consumption based on the determination result are known (e.g., see Patent Literature 1).

CITATION LIST

Patent Literature

Patent Literature 1: Japanese Patent Application Laid-Open No. 2011-237842

SUMMARY

Modes in which a plurality of users share a predetermined space are becoming popular in recent years, for example, a mode in which a plurality of users share the same vehicle and a mode in which a plurality of users work in the same workspace, and the like.

It is an object of the present disclosure to provide a technique capable of suitably intermediating information exchange among users who share a predetermined space.

An information processing apparatus according to the present disclosure is provided with a controller configured to execute: receiving first information which is information requesting provision of contact information indicating a contact address of a second user, transmitted from a first user terminal which is a terminal used by a first user; and transmitting to a second user terminal used by the second user, second information which is information requesting permission to provide the contact information to the first user and which includes information capable of identifying the first user. The information processing apparatus according to the present disclosure may be further provided with a storage unit configured to store information relating to a sharing user who is a user sharing or having a history of sharing the predetermined space with the first user. And, the controller according to the present disclosure may be further configured to identify, when the controller receives the first information from the first user terminal, the second user who is sharing or has a history of sharing the predetermined space with the first user based on the information stored in the storage unit.

Furthermore, the present disclosure can also be perceived as an information processing method. In this case, the information processing method according to the present disclosure may be configured to cause a computer to execute: a step of receiving first information which is information requesting provision of contact information indicating a contact address of a second user, transmitted from a first user terminal which is a terminal used by a first user; and a step of transmitting to a second user terminal which is a terminal used by the second user, second information which is information requesting permission to provide the contact information to the first user and which includes information capable of identifying the first user. The computer according to the present disclosure may be equipped with a storage unit configured to store information relating to a sharing user who is a user sharing or has a history of sharing a predetermined space with the first user. And, the information processing method may be further configured to cause the computer to execute: a step of identifying, when the computer receives the first information from the first user terminal, the second user who is sharing or has a history of sharing the predetermined space with the first user based on the information stored in the storage unit.

Furthermore, the present disclosure can also be perceived as an information processing program or a non-transitory storage medium stored with the information processing program. In this case, the information processing program according to the present disclosure may be configured to cause a computer to execute: a step of receiving first information which is information requesting provision of contact information indicating a contact address of a second user, transmitted from a first user terminal which is a terminal used by a first user; and a step of transmitting to a second user terminal which is a terminal used by the second user, second information which is information requesting permission to provide the contact information to the first user and which includes information capable of identifying the first user. The computer according to the present disclosure may be equipped with a storage unit configured to store information relating to a sharing user who is a user sharing or has a history of sharing a predetermined space with the first user. And, the information processing program may be further configured to cause the computer to execute: a step of identifying, when the computer receives the first information from the first user terminal, the second user who is sharing or has a history of sharing the predetermined space with the first user based on the information stored in the storage unit.

According to the present disclosure, it is possible to preferably intermediate information exchange among users who share a predetermined space.

BRIEF DESCRIPTION OF DRAWINGS

FIG. 1 is a diagram for describing an overview of ride-sharing;

FIG. 2 is a diagram illustrating a schematic configuration of a ride-sharing system;

FIG. 3 is a diagram illustrating a hardware configuration of a user terminal and a server apparatus according to a first embodiment;

FIG. 4 is a block diagram illustrating a functional configuration of the server apparatus according to the first embodiment;

FIG. 5 is a diagram illustrating a configuration example of a traveling schedule information table;

FIG. 6 is a diagram illustrating a configuration example of a movement schedule information table;

FIG. 7 is a diagram illustrating a configuration example of a reservation information table;

FIG. 8 is a diagram illustrating another configuration example of the reservation information table;

FIG. 9 is a diagram illustrating a configuration example of a member information table;

FIG. 10A is a diagram schematically illustrating an example of a data configuration of first information according to the first embodiment;

FIG. 10B is a diagram schematically illustrating an example of a data configuration of second information according to the first embodiment;

FIG. 10C is a diagram schematically illustrating an example of a data configuration of third information according to the first embodiment;

FIG. 11 is a block diagram illustrating a functional configuration of a user terminal according to the first embodiment;

FIG. 12A is a flowchart illustrating an overview of a flow of data transmitted/received among respective components of a ride-sharing system and a processing flow carried out by the respective components when a first user requests contact information according to the first embodiment;

FIG. 12B is a flowchart illustrating operation of a server apparatus when first information is received according to the first embodiment;

FIG. 12C is a flowchart illustrating operation of the server apparatus when third information is received according to the first embodiment;

FIG. 13 is a diagram illustrating an example of a screen for selecting contact information that can be provided to the first user, displayed on the second user terminal according to modification 1 of the first embodiment;

FIG. 14 is a diagram schematically illustrating an example of a data configuration of the third information according to modification 1 of the first embodiment;

FIG. 15 is a flowchart illustrating operation of the server apparatus when the third information is received according to modification 1 of the first embodiment;

FIG. 16 is a diagram illustrating a configuration example of a member information table according to modification 2 of the first embodiment;

FIG. 17 is a flowchart illustrating operation of the server apparatus when the third information is received according to the modification 2 of the first embodiment;

FIG. 18 is a flowchart illustrating operation of the server apparatus when the first information is received according to modification 3 of the first embodiment;

FIG. 19 is a diagram illustrating a configuration example of a member information table according to modification 4 of the first embodiment;

FIG. 20 is a flowchart illustrating operation of the server apparatus when the first information is received according to modification 4 of the first embodiment;

FIG. 21 is a diagram illustrating a schematic configuration of a space sharing system;

FIG. 22 is a block diagram illustrating a functional configuration of a server apparatus according to a second embodiment;

FIG. 23 is a diagram illustrating a configuration example of a workspace information table;

FIG. 24 is a diagram illustrating a configuration example of a rental information table;

FIG. 25 is a diagram illustrating a configuration example of a member information table;

FIG. 26 is a diagram schematically illustrating an example of a data configuration of first information according to the second embodiment; and FIG. 27 is a block diagram illustrating a functional configuration of a user terminal according to the second embodiment.

DESCRIPTION OF EMBODIMENTS

The present disclosure is an information processing apparatus for intermediating information exchange among users who share a predetermined space. Here, when the predetermined space is shared among a plurality of users, a certain user (first user) may want to exchange information with a specific sharing user (second user). When the first user requests provision of information indicating a contact address (contact information) of the second user from a provider or the like of the above predetermined space, if the above provider or the like provides the contact information to the first user without the second user's consent, the first user may have contact with the second user against the second user's will.

In contrast, in an information processing apparatus according to the present disclosure, while the first user and the second user are sharing a predetermined space or when the first user and the second user have a history of sharing the predetermined space, upon receiving first information requesting provision of contact information indicating a contact address of the second user which is transmitted from a first user terminal used by the first user, a controller transmits to a second user terminal used by the second user, second information including information capable of identifying the first user, which is information requesting permission to provide of the contact information to the first user. In this case, the second user can determine whether or not to permit provision of the contact information to the first user based on information capable of identifying the first user included in the above second information. That is, the second user can determine whether or not to permit provision of the contact information to the first user. This prevents the first user from contacting the second user against the second user's will. It is thereby possible to preferably intermediate information exchange among the users who share the predetermined space.

Note that the "predetermined space" referred to here is a space shared by a plurality of users having a specific purpose such as a riding space of a vehicle shared among a plurality of users for a traveling purpose or a workspace for a plurality of users to perform their respective works for a work purpose.

Hereinafter, specific embodiments of the present disclosure will be described based on the accompanying drawings. Dimensions, materials, shapes, and other relative arrangements or the like of components described in the present embodiments are not intended to limit the technical scope of the disclosure to those embodiments unless specified otherwise.

First Embodiment

An example will be described in the present embodiment where the present disclosure is implemented in a mode in which a plurality of users intended for traveling share the same vehicle (hereinafter referred to as "ride-sharing"). Note that automobiles and trains or the like can be used as vehicles that can be shared among a plurality of users for a traveling purpose. A case will be described in the present embodiment where an automobile is used as an example of such vehicles.

(Overview of Ride-Sharing)

First, an overview of ride-sharing will be described based on FIG. 1. In an example shown in FIG. 1, suppose that a user A travels from a starting point d to a destination point e, a user B travels from a starting point f to a destination point g and a user C travels from a starting point h to the destination point e.

Here, if the users A to C travel separately in their respective vehicles, three vehicles are necessary. In contrast, if the users A to C share the same vehicle, the users A to C can travel to their respective destinations in one vehicle. In the example shown in FIG. 1, the user A himself/herself drives a vehicle and travels from the point d to the point e. At this time, the user A allows the user B to get in the vehicle driven by the user A at the point f, and allows the user C to get in the vehicle driven by the user A at the point h. On the way to the point e which is the destination of the user A and the user C, the user A travels via the point g, where the user B gets off the vehicle, thus allowing the user B to travel from the starting point f to the destination point g. After that, the user A drives the vehicle from the point g to the point e to thereby allow the user C to travel from the starting point h to the destination point e, and at the same time the user A himself/herself can attain the traveling of the user A.

Such ride-sharing can reduce the number of vehicles traveling on a road, and can thereby relax traffic jam. Furthermore, since a plurality of users who share the same vehicle share transportation expenses (fuel expenses or the like) necessary for traveling in the vehicle, it is possible to cut down on a transportation cost per user compared to a case where each user travels in an individual vehicle.

Note that the aspect of ride-sharing shown in FIG. 1 is merely an example, and combinations of users who share one vehicle can be determined using well-known techniques.

Here, the aforementioned ride-sharing can occur even when users who do not know each other's contact address share one vehicle. In such a case, a certain user (first user) may want to exchange information with a specific user (second user) of other user (sharing user) who is sharing or has a history of sharing the same vehicle with the first user. In response to this, the present embodiment allows the first user to request a provider of a ride-sharing service to provide information indicating a contact address of the second user (contact information) using the user terminal of the first user himself/herself. In that case, however, if the above provider provides the above contact information to the first user without the consent of the second user, the first user may possibly contact the second user against the second user's will. Thus, according to the present embodiment, upon receiving information requesting provision of the above contact information, a server apparatus for processing information on operation and management of a ride-sharing service inquires the second user about whether or not permit to comply with the request, and complies with the above request only if the second user's permission is obtained.

(System Configuration)

FIG. 2 is a diagram illustrating a configuration example of a system for providing a ride-sharing service (hereinafter may also be referred to as a "ride-sharing system"). In the example shown in FIG. 2, the ride-sharing system is constructed of a vehicle 10 used for ride sharing, a user terminal 200 used by a user sharing the vehicle 10 and a server apparatus 300. The user terminal 200 and the server apparatus 300 are mutually connectable via a network N1. A WAN (Wide Area Network) which is a worldwide public communication network such as the Internet or other communication networks may be adopted for the network N1. The network N1 may include a telephone communication network such as mobile phones or a wireless communication network such as WiFi.

Note that although only one vehicle 10 is illustrated in the example shown in FIG. 2 as the vehicle available for the ride-sharing service, suppose that the ride-sharing system includes a number of vehicles registered as vehicles available for the ride-sharing service. In the example shown in FIG. 2, only two terminals: a first user terminal 200A used by a first user and a second user terminal 200B used by a second user who is sharing or has a history of sharing the same vehicle 10 with the first user are illustrated, but suppose that the ride-sharing system includes a number of user terminals corresponding to the number of users registered as members entitled to use the ride-sharing service. Of the "first user" and the "second user" referred to here, one user may be a driver of the vehicle 10 or both users may be fellow passengers (passengers permitted to ride on the vehicle 10 driven by a person other than the first user and the second user).

A predetermined application for using a ride-sharing service is installed in the user terminal 200. The user of the user terminal 200 causes the own user terminal 200 to execute the above predetermined application, and can thereby register information relating to conditions or the like when sharing a vehicle (hereinafter may also be referred to as "request information") in the server apparatus 300. For example, when the user becomes a fellow passenger of the vehicle 10, the user causes the user terminal 200 to execute the above predetermined application, and can thereby register information relating to their own desired ride sharing period and ride sharing date and time or the like in the server apparatus 300 as request information. On the other hand, when the user becomes a driver of the vehicle 10, the user causes the user terminal 200 to execute the above predetermined application, and can thereby register information relating to their own planned traveling period and traveling date and time or the like in the vehicle 10 in the server apparatus 300 as request information. Note that details of the user terminal 200 will be described later.

The server apparatus 300 receives the request information from the user who becomes a driver of the vehicle 10 (hereinafter may also be referred to as "driver user") and the request information from the user who becomes a fellow passenger of the vehicle 10 (hereinafter may also be referred to as "fellow passenger user"). The server apparatus 300 determines a provisional combination of a driver user and a fellow passenger user based on the request information from the driver user and the request information from the fellow passenger user. The server apparatus 300 transmits information indicating ride sharing conditions to the user terminals 200 of the driver user and the fellow passenger user in the above provisional combination. When the server apparatus 300 receives information accepting the ride sharing conditions from the respective user terminals 200 of the driver user and the fellow passenger user, the server apparatus 300 confirms the above provisional combination as an official combination. Hereinafter, a process for the server apparatus 300 to confirm a combination of a driver user and a fellow passenger user using the above procedure will be referred to as a "matching process."

Furthermore, in addition to a function of performing the above matching process, the server apparatus 300 according to the present embodiment also has a function of intermediating information exchange among users who are sharing or have a history of sharing the same vehicle 10. Here, in a case where the first user and the second user who do not know each other's contact address share the same vehicle 10, the first user may want to exchange information with the second user. That is, the first user may want information necessary to exchange information with the second user (contact information which is information indicating a contact address of the second user) to be provided. Therefore, according to the present embodiment, when the server apparatus 300 receives information requesting provision of the above contact information transmitted from the first user terminal 200A (first information), the server apparatus 300 transmits information requesting permission about the provision of the above contact information to the first user (second information) to the second user terminal 200B. When the server apparatus 300 receives information (third information) on whether or not to permit the provision of the above contact information transmitted from the second user terminal 200B to the first user in response to the above second information, the server apparatus 300 transmits the above contact information to the first user terminal 200A if the third information is information indicating permission to provide the contact information to the first user. On the other hand, when the third information is information indicating non-permission to provide the contact information to the first user, the server apparatus 300 does not transmit the above contact information to the first user terminal 200A, but transmits information indicating that permission about the provision of the contact information is not granted (non-permission information) to the first user terminal 200A. Note that according to the present embodiment, the server apparatus 300 that has a function of intermediating information exchange among users who are sharing or have a history of sharing the same vehicle 10 corresponds to an "information processing apparatus" according to the present disclosure.

(Hardware Configuration)

FIG. 3 is a diagram illustrating a hardware configuration of each of the user terminal 200 and the server apparatus 300. Note that the first user terminal 200A and the second user terminal 200B shown in aforementioned FIG. 2 each have a hardware configuration similar to the configuration of the user terminal 200 in FIG. 3.

The server apparatus 300 has a configuration of a general computer. That is, the server apparatus 300 includes a processor 301, a main storage unit 302, an auxiliary storage unit 303 and a communication unit 304. These components are mutually connected via a bus. The main storage unit 302 and the auxiliary storage unit 303 are computer-readable storage media. The hardware configuration of the computer is not limited to the configuration example shown in FIG. 3, but components may be omitted, replaced or added as appropriate.

The server apparatus 300 implements functions matching to a predetermined object by the processor 301 loading a work region of the main storage unit 302 with a program stored in the storage medium and executing the program, and controlling the respective function components through execution of the program.

The processor 301 is, for example, a CPU (Central Processing Unit) or a DSP (Digital Signal Processor). The processor 301 controls the server apparatus 300 and performs operations of various kinds of information processing.

The main storage unit 302 includes, for example, a RAM (Random Access Memory) and a ROM (Read Only Memory). The auxiliary storage unit 303 is, for example, an EPROM (Erasable Programmable ROM) or a hard disk drive (HDD). Furthermore, the auxiliary storage unit 303 can include a removable medium, that is, a removable storage medium. The removable medium is a disk storage medium such as a USB (Universal Serial Bus) memory, a CD (Compact Disc) or a DVD (Digital Versatile Disc).

The auxiliary storage unit 303 stores various programs, various kinds of data and various tables in a storage medium in a freely readable/writable state. The auxiliary storage unit 303 stores an operating system (OS), various programs and various tables or the like. Note that a part or a whole of these pieces of information may also be stored in the main storage unit 302. Information stored in the main storage unit 302 may be stored in the auxiliary storage unit 303.

The communication unit 304 transmits/receives information between an external apparatus and the server apparatus 300. The communication unit 304 is, for example, a LAN (Local Area Network) interface board or a wireless communication circuit for wireless communication. The LAN interface board or wireless communication circuit is connected to a network N1.

A series of processes executed by the server apparatus 300 configured as described above may be executed by hardware or may also executed by software.

Next, the user terminal 200 is a small computer that can be carried by the user such as a smartphone, a mobile phone, a tablet terminal, a personal information terminal, a wearable computer (smart watch or the like). Note that the user terminal 200 may also be a personal computer (PC) connected to the server apparatus 300 via the network N1 such as the Internet which is a public communication network.

The user terminal 200 includes a processor 201, a main storage unit 202, an auxiliary storage unit 203, a display unit 204, an input unit 205 and a communication unit 206. Since the processor 201, the main storage unit 202 and the auxiliary storage unit 203 are similar to the processor 301, the main storage unit 302 and the auxiliary storage unit 303 of the server apparatus 300, description thereof is omitted. The display unit 204 is, for example, an LCD (Liquid Crystal Display) or an EL (Electroluminescence) panel. The input unit 205 includes, for example, a touch panel that allows symbols such as characters to be inputted, push buttons, a microphone that allows voice to be inputted or a camera that allows a moving image or still image to be picked up. The communication unit 206 is a communication circuit for accessing the network N1 using, for example, a mobile communication service (telephone communication network such as a mobile phone or wireless communication of WiFi or the like) and carrying out data communication with the server apparatus 300 or the like.

(Functional Configuration of Server Apparatus)

Here, a functional configuration of the server apparatus 300 will be described based on FIG. 4. As shown in FIG. 4, the server apparatus 300 of the present embodiment includes, as functional components thereof, a matching processing unit F310, an information exchange processing unit F320, a traveling schedule management database D310, a movement schedule management database D320 and a reservation management database D330. Here, the matching processing unit F310 and the information exchange processing unit F320 are formed by the processor 301 of the server apparatus 300 executing a computer program in the main storage unit 302. Note that anyone or part of the matching processing unit F310 and the information exchange processing unit F320 may be formed of a hardware circuit.

The traveling schedule management database D310, the movement schedule management database D320, the reservation management database D330 and a member information management database D340 are constructed by a program of a database management system (DBMS) executed by the processor 301 of the server apparatus 300 managing data stored in the auxiliary storage unit 303. These traveling schedule management database D310, movement schedule management database D320, reservation management database D330 and member information management database D340 are, for example, relational databases.

Note that anyone or part of processing thereof of the respective functional components of the server apparatus 300 may be executed by another computer connected to the network N1. For example, each process included in the matching processing unit F310 and each process included in the information exchange processing unit F320 may be executed by different computers.

The traveling schedule management database D310 stores a traveling schedule of each vehicle 10, where identification information of a driver user of the vehicle 10 is associated with a traveling schedule of the vehicle 10. Here, a configuration example of traveling schedule information stored in the traveling schedule management database D310 will be described based on FIG. 5. FIG. 5 is a diagram illustrating a table configuration of traveling schedule information. Note that information registered in the traveling schedule information table is not limited to the example shown in FIG. 5, but fields may be added, changed or deleted as appropriate.

The traveling schedule information table shown in FIG. 5 includes fields such as a vehicle ID, a driver user ID, a place of departure, a scheduled date and time of departure, a destination, a scheduled date and time of arrival, and a status. A vehicle ID which is information for identifying each vehicle 10 available for ride sharing is registered in the vehicle ID field. The vehicle ID referred to here is information assigned together with a user ID which will be described later when a driver user of each vehicle 10 applies for membership registration for a ride-sharing service, and is information for identifying each vehicle 10. A certain user ID which is information for identifying a driver user of each vehicle 10 available for ride sharing is registered in the driver user ID field. The user ID is information assigned when a driver user of the vehicle 10 available for ride sharing applies for membership registration for a ride-sharing service. Information indicating a place of departure of the vehicle 10 available to each driver user for ride sharing is registered in the place of departure field. Note that the place of departure referred to here is not limited to a place where the driver user starts traveling in the vehicle 10, but can be changed by the driver user according to his/her convenience as appropriate. For example, a place where the driver user traveling in the vehicle 10 driven by the driver user stops by on the way to the destination can also be set as the place of departure. Information indicating a scheduled date and time of departure at which the driver user leaves the above place of departure in the vehicle 10 driven by the driver user is registered in the scheduled date and time of departure field. Information indicating a destination for which the driver user is heading in the vehicle 10 available for ride sharing is registered in the destination field. Note that the destination referred to here is not limited to a place where the driver user's traveling in the vehicle 10 ends, but can be changed according to the convenience of the driver user as appropriate. For example, a place where the driver user traveling in the vehicle 10 stops by on the way to the place where the traveling ends can also be set as the destination. Information indicating a scheduled date and time at which the driver user traveling in the vehicle 10 driven by the driver user arrives at the above destination is registered in the scheduled date and time of arrival field. Information indicating a traveling situation of the vehicle 10 driven by the driver user is registered in the status field. For example, the status is registered as "already arrived" when the vehicle 10 driven by the driver user has already arrived at the destination, and the status is registered as "traveling" when the vehicle 10 driven by the driver user is traveling from the place of departure to the destination, and the status is registered as "before departure" when the vehicle 10 driven by the driver user has not departed from the place of departure yet. Note that for the vehicle 10 registered as "traveling" in the above status field, information relating to the current position of the vehicle 10 may also be registered in the status field. A current position of the vehicle 10 in that case may be acquired by the server apparatus 300 through communication with the user terminal 200 of the driver user or may be acquired by the server apparatus 300 through communication with a device mounted on the vehicle 10 enabled to communicate.

The movement schedule management database D320 stores a movement schedule of a fellow passenger user who wants ride sharing of an arbitrary vehicle 10, where identification information of the fellow passenger user is associated with the movement schedule. Here, one configuration example of the movement schedule information stored in the movement schedule management database D320 will be described based on FIG. 6. FIG. 6 is a diagram illustrating a table configuration of the movement schedule information. Note that the information registered in the movement schedule information table is not limited to the example shown in FIG. 6, but fields can be added, changed or deleted as appropriate.

The movement schedule information table shown in FIG. 6 includes fields such as a fellow passenger user ID, a getting-on spot, a desired getting-on date and time, a getting-off spot, a desired getting-off date and time and a status. A user ID for identifying each fellow passenger user is registered in the fellow passenger user ID field. The user ID of the fellow passenger user is information assigned when the fellow passenger user applies for membership registration for a ride-sharing service as in the case of the aforementioned driver user ID. Information indicating a place where each fellow passenger user wants to ride on the vehicle 10 available for ride sharing is registered in the getting-on spot field. Information indicating a date and time at which each fellow passenger user wants to ride on the vehicle 10 available for ride sharing at the above getting-on spot is registered in the desired getting-on date and time field. Information indicating a place where each fellow passenger wants to get off the vehicle 10 available for ride sharing is registered in the getting-off spot field. Information indicating a date and time at which each fellow passenger user wants to get off the vehicle 10 available for ride sharing at the above getting-off spot is registered in the desired getting-off date and time field. Information indicating a traveling situation of the fellow passenger user is registered in the status field. For example, the status is registered as "already got off" when the fellow passenger user has already gotten off the vehicle 10 available for ride sharing at the above getting-off spot, the status is registered as "reserved" when a driver user to be combined with a fellow passenger user is confirmed but the fellow passenger user has not yet got on the vehicle 10 driven by the driver user, and the status is registered as "matching in progress" when a driver user to be combined with a fellow passenger user is not confirmed yet.

The reservation management database D330 stores reservation information for a ride-sharing service, where information relating to the driver user is associated with information relating to a fellow passenger user scheduled to share the vehicle 10 driven by the driver user. Here, one configuration example of reservation information stored in the reservation management database D330 will be described based on FIG. 7. FIG. 7 is a diagram illustrating a table configuration of reservation information. Note that information registered in the reservation information table is not limited to the example shown in FIG. 7, but fields can be added, changed or deleted as appropriate.

The reservation information table shown in FIG. 7 includes fields such as a reservation ID, a driver user ID, a vehicle information, a fellow passenger user ID, a getting-on spot, a scheduled getting-on date and time, a getting-off spot, a scheduled getting-off date and time, a seat and a status. A reservation ID which is information for identifying individual reservation information is registered in the reservation ID field. For example, this reservation ID is used when each user confirms or changes reservation contents. A user ID of a driver user driving the vehicle 10 that can be shared is registered in the driver user ID field. Information necessary for a fellow passenger user who shares the vehicle 10 to identify the vehicle 10 driven by each driver user is registered in the vehicle information field. For example, information such as vehicle model, automobile registration number (number displayed on the number plate), vehicle body color or the like is registered in the vehicle information field. A user ID of a fellow passenger user scheduled to share the vehicle 10 driven by each driver user is registered in the fellow passenger user ID field. Information indicating a place where a fellow passenger user is allowed to get on the vehicle 10 driven by each driver user is registered in the getting-on spot field. Information indicating a scheduled date and time at which a fellow passenger user is allowed to get on the vehicle 10 driven by each driver user at the above getting-on spot is registered in the scheduled getting-on date and time field. Information indicating a place where a fellow passenger user is allowed to get off the vehicle 10 driven by each driver user is registered in the getting-off spot field. Information indicating a scheduled date and time at which a fellow passenger user is allowed to get off the vehicle 10 driven by each driver user at the above getting-off spot is registered in the scheduled getting-off date and time field. Information indicating the position of a seat in which a fellow passenger user sits in each vehicle 10 used for ride sharing is registered in the seat field. The seat position of the fellow passenger user may be determined at a point in time at which a combination of a driver user and a fellow passenger user is confirmed through a matching process. Furthermore, the seat position of the fellow passenger user may also be determined at a point in time at which the fellow passenger user gets on the vehicle 10 used for ride sharing. In that case, the information registered in the above seat field may be transmitted from the user terminal 200 of the driver user or the fellow passenger user to the server apparatus 300 at a point in time at which the seat position of the fellow passenger user is determined. Information indicating a ride sharing situation of each vehicle 10 is registered in the status field. For example, the status is registered as "already got off" when the fellow passenger user has already got off the vehicle 10 at the above getting-off spot, the status is registered as "getting on" when the fellow passenger user is sharing the vehicle 10 and the status is registered as "before getting on" in a stage before the fellow passenger user gets on the vehicle 10.

Note that the reservation information table in FIG. 7 corresponds to a table configuration example when one fellow passenger user shares the vehicle 10 driven by each driver user, but the number of fellow passenger users who share the vehicle 10 driven by each driver user may be two or more. In that case, as shown in FIG. 8, one driver user ID may be associated with information of a plurality of fellow passenger users.

The member information management database D340 stores information on users registered as members in the ride-sharing service (member information). Here, one configuration example of member information stored in the member information management database D340 will be described based on FIG. 9. FIG. 9 is a diagram illustrating a table configuration of member information. Note that information registered in the member information table is not limited to the example shown in FIG. 9, but fields can be added, changed or deleted as appropriate.

The member information table shown in FIG. 9 includes fields such as a user ID, a contact address, an attribute, authentication and a vehicle ID. A user ID assigned when each user applies for member registration for a ride-sharing service is registered in the user ID field. Information indicating a contact address of each user (e.g., electronic mail address, telephone number, or the like, including at least an electronic mail address of the user terminal 200 used by each user) is registered in the contact field. Information indicating an attribute of each user (e.g., name, nickname, age, gender, occupation, work place (school), hobby, skill or the like) is registered in the attribute field. Information indicating a password or the like necessary for authentication when the aforementioned request information is registered in the server apparatus 300 or when the aforementioned reservation information is confirmed is registered in the authentication field. A vehicle ID of the vehicle 10 available to each user for ride sharing is registered in the vehicle ID field. Note that, for example, "None" is registered in the vehicle ID field for a user not possessing the vehicle 10 available for ride sharing.

Next, the matching processing unit F310 performs a matching process based on request information from a driver user or a fellow passenger user. More specifically, when the server apparatus 300 receives request information transmitted from the user terminal 200 of the driver user, the matching processing unit F310 generates a traveling schedule information table as shown in aforementioned FIG. 5 based on the request information and stores the generated traveling schedule information table in the traveling schedule management database D310. Furthermore, when the server apparatus 300 receives request information transmitted from the user terminal 200 of the fellow passenger user, the matching processing unit F310 generates a movement schedule information table as shown in aforementioned FIG. 6 based on the request information and stores the generated movement schedule information table in the movement schedule management database D320. The matching processing unit F310 compares the traveling schedule information table stored in the traveling schedule management database D310 and the movement schedule information table stored in the movement schedule management database D320 and extracts a traveling schedule suitable for a movement schedule of each fellow passenger user. Next, the matching processing unit F310 provisionally combines the driver user associated with the extracted traveling schedule and the above fellow passenger user. Once the provisional combination of the driver user and the fellow passenger user is determined through the above procedure, the matching processing unit F310 transmits information indicating ride sharing conditions (e.g., getting-on spot of the fellow passenger user, scheduled getting-on date and time of the fellow passenger user, getting-off spot of the fellow passenger user, scheduled getting-off date and time of the fellow passenger user, type of the vehicle 10, or the like) to the respective user terminals 200 of the driver user and the fellow passenger user in the above provisional combination. In response to this, when information accepting the above ride sharing conditions are sent back from both user terminals 200 of the driver user and the fellow passenger user, the matching processing unit F310 confirms the above provisional combination as an official combination. Accordingly, the matching processing unit F310 generates a reservation information table as shown in aforementioned FIG. 7 based on the above official combination, and stores the generated reservation information table in the reservation management database D330. Note that the method for executing the matching process by the matching processing unit F310 is not limited to the above method, but the matching process may be executed using other methods using known techniques.

When the server apparatus 300 receives first information transmitted from the user terminal of the user (first user) who uses the ride-sharing service (first user terminal 200A), the information exchange processing unit F320 executes a predetermined information exchange process.

As described above, the first information according to the present embodiment is information requesting provision of contact information (information indicating a contact address of a specific sharing user (second user) who is sharing or has a history of sharing the same vehicle 10 with the first user). Here, a data configuration example of the first information according to the present embodiment will be described based on FIG. 10A. FIG. 10A is a diagram schematically illustrating an example of the data configuration of the first information. The first information according to the present embodiment is basically constructed of contact request information, a reservation ID and riding position information. The contact request information is information for identifying that information constructed of the contact request information, the reservation ID and the riding position information is the first information (that is, information requesting provision of the contact information). Note that since a plurality of pieces of first information can be assumed to be transmitted to the server apparatus 800, the contact request information may be formed so as to be able to identify the individual pieces of first information. The reservation ID is a reservation ID when the first user and the second user share the vehicle and corresponds to "space identification information" according to the present disclosure. The riding position information is information indicating a riding position of the second user in the vehicle 10 shared between the first user and the second user, and corresponds to the "second user identification information" according to the present disclosure. In the present example, the seat position of the second user is used as the riding position information. Note that the space identification information included in the first information is not limited to the reservation ID as shown in FIG. 10A, and it is possible to use at least one of vehicle information of the vehicle 10 which is being shared or which has been shared between the first user and the second user, information indicating a getting-on spot of the first user when the first user and the second user are sharing or have shared the same vehicle 10, information indicating a scheduled getting-on date and time of the first user when the first user and the second user are sharing or have shared the same vehicle 10, information indicating a getting-off spot of the first user when the first user and the second user are sharing or have shared the same vehicle 10, information indicating a scheduled getting-off date and time of the first user when the first user and the second user are sharing or have shared the same vehicle 10, information indicating a seat position of the first user when the first user and the second user are sharing or have shared the same vehicle 10. In short, the space identification information included in the first information may be information that can identify the vehicle 10 which is being shared or which has been shared between the first user and the second user. Furthermore, the second user identification information included in the first information is not limited to the riding position information as shown in FIG. 10A, but information indicating a getting-on spot or getting-off spot of the second user when the first user and the second user are sharing or have shared the same vehicle 10 can also be used. Furthermore, appearance image information may also be attached to the first information. The appearance image information referred to here is still image information or moving image information obtained by picking up images of appearance of the first user at the user terminal 200, which will be described later.

The predetermined information exchange process in the present embodiment is a process of providing the above contact information to the first user exclusively when the second user's consent about the provision of the above contact information to the first user is obtained. The predetermined information exchange process according to the present embodiment will be described hereinafter.

In the predetermined information exchange process according to the present embodiment, the information exchange processing unit F320 executes a process of identifying the second user to acquire information necessary to communicate with the second user terminal 200B used by the second user first. More specifically, the information exchange processing unit F320 accesses the reservation management database D330 by using a reservation ID included in the first information as an argument and thereby identifies the reservation information table corresponding to the reservation ID. The vehicle 10 which is being shared or which has been shared between the first user and the second user is thereby identified. Note that instead of the reservation ID, if at least one of the following information: vehicle information of the vehicle 10 which is being shared or which has been shared between the first user and the second user; information indicating a getting-on spot of the first user when the first user and the second user are sharing or have shared the same vehicle 10; information indicating a scheduled getting-on date and time of the first user when the first user and the second user are sharing or have shared the same vehicle 10; information indicating a getting-off spot of the first user when the first user and the second user are sharing or have shared the same vehicle 10; information indicating a scheduled getting-off date and time of the first user when the first user and the second user are sharing or have shared the same vehicle 10; and information indicating a seat position of the first user when the first user and the second user are sharing or have shared the same vehicle 10 is included in the first information as the space identification information, the information exchange processing unit F320 may identify a reservation information table in which information that matches the above space identification information is registered from among the reservation information tables stored in the reservation management database D330. Next, the information exchange processing unit F320 extracts a user ID of the user sitting in the seat that matches the riding position information (seat position information) included in the first information in the identified reservation information table. In that case, when the riding position information included in the first information is information indicating the driver's seat of the vehicle 10, the information exchange processing unit F320 may extract a user ID registered in the driver user ID field of the above reservation information table. On the other hand, when the riding position information included in the first information is information indicating a seat other than the driver's seat of the vehicle 10, the information exchange processing unit F320 may extract a user ID registered in the fellow passenger user ID field of fellow passenger users for whom seat position information matching the riding position information is registered in the seat field from among the fellow passenger users registered in the above reservation information table. Note that when information indicating the getting-on spot or the getting-off spot of the second user is included in the first information instead of the information indicating the riding position of the second user, the user ID of the fellow passenger user for whom information that matches the information indicating a getting-on spot or a getting-off spot included in the first information is registered in the getting-on spot field or the getting-off spot field may be extracted from among the fellow passenger users registered in the reservation information table. When the user ID of the second user is extracted in this way, the information exchange processing unit F320 accesses the member information management database D340 by using the extracted user ID as an argument and thereby identifies a member information table corresponding to the user ID. The second user who is sharing or has a history of sharing the same vehicle 10 with the first user is thereby identified.

When the second user is identified according to the above procedure, the information exchange processing unit F320 executes a process of requesting the second user to permit provision of the contact information to the first user. More specifically, the information exchange processing unit F320 first acquires information necessary to communicate with the second user terminal 200B (e.g., electronic mail address of the second user terminal 200B) from the contact field in the member information table of the second user. Next, the information exchange processing unit F320 transmits second information to the acquired electronic mail address.

The second information according to the present embodiment is information requesting permission for provision of the above contact information to the first user as described above. Here, a data configuration example of the second information according to the present embodiment will be described based on FIG. 10B. FIG. 10B is a diagram schematically illustrating an example of a data configuration of the second information. The second information according to the present embodiment is constructed of permission request information and user identification information. The permission request information is information for causing the user terminal 200 to identify that the information constructed of the permission request information and the user identification information is the second information (that is, information requesting permission for provision of contact information to the first user). Note that since it is predictable that a plurality of pieces of second information may be transmitted to the second user terminal 200B, the permission request information may be formed to ensure that individual pieces of second information are identifiable. The user identification information is information for enabling the second user to identify the first user to whom the contact information is provided. The user identification information is formed by including at least one of, for example, attribute information of the first user, information indicating the riding position of the first user in the vehicle 10 shared between the first user and the second user and appearance image information of the first user. Note that the attribute information of the first user is information including part or a whole of the information registered in the attribute field in the member information table of the first user (name, nickname, age, gender, occupation, work place (school), hobby, skill or the like). The information indicating the riding position of the first user in the vehicle 10 shared between the first user and the second user is information indicating the seat position registered in the seat field of the first user in the reservation information table corresponding to the reservation ID included in the first information. The appearance image information of the first user is appearance image information attached to the first information received from the first user terminal 200A.

After the second information configured as described above is transmitted from the server apparatus 300 to the second user terminal 200B, if the server apparatus 300 receives third information transmitted from the second user terminal 200B in response to the second information, the information exchange processing unit F320 determines whether or not to transmit contact information to the first user terminal 200A based on the third information.

The third information according to the present embodiment is information indicating whether or not to permit to provide contact information to the first user. Here, a data configuration example of the third information according to the present embodiment will be described based on FIG. 10C. FIG. 10C is a diagram schematically illustrating an example of a data configuration of the third information. The third information according to the present embodiment is constructed of answer information and answer type information. The answer information is information for the server apparatus 300 to identify that information including the answer information and the answer type information is the third information (that is, information as to whether or not to permit to provide contact information to the first user). Note that since it is predictable that a plurality of pieces of third information may be transmitted to the server apparatus 300, the answer information may be formed so that individual pieces of third information can be identified. The answer type information is information indicating the type of answer to the second information, that is, information for distinguishing whether or not to permit to provide contact information to the first user.

When the server apparatus 300 receives the third information configured as described above, the information exchange processing unit F320 determines whether or not to transmit contact information to the first user terminal 200A based on the answer type information included in the third information. Here, if the above answer type information is information permitting provision of contact information to the first user, the information exchange processing unit F320 transmits the above contact information to the first user terminal 200A. Here, when the above contact information is transmitted from the server apparatus 300 to the first user terminal 200A, information indicating a name to call the second user (name or nickname or the like) may also be transmitted from the server apparatus 300 to the first user terminal 200A. On the other hand, if the above answer type information is information not permitting provision of contact information to the first user, the information exchange processing unit F320 does not transmit the above contact information to the first user terminal 200A. In that case, the information exchange processing unit F320 transmits non-permission information indicating that permission to provide contact information has not been granted to the first user terminal 200A.

(Functional Configuration of User Terminal)

FIG. 11 is a diagram illustrating a functional configuration of the user terminal 200. The user terminal 200 is provided with a reservation registration unit F210, a contact request unit F220 and an acceptance processing unit F230 as functional components. These reservation registration unit F210, contact request unit F220 and acceptance processing unit F230 are formed by the processor 201 of the user terminal 200 executing a computer program in the main storage unit 202. Note that any one of the above functional components or part of the processing thereof may be executed by a hardware circuit.

The reservation registration unit F210 receives an input of request information to the input unit 205 from the user and transmits the inputted request information to the server apparatus 300. When information indicating ride sharing conditions in a provisional combination of a driver user and a fellow passenger user is transmitted from the server apparatus 300 to the user terminal 200 in response to the above request information, the reservation registration unit F210 displays information indicating the ride sharing conditions in the provisional combination on the display unit 204. In that case, the reservation registration unit F210 executes a process of urging the user to select whether or not to accept the information indicating the above ride sharing conditions (e.g., process of displaying a button for selecting whether or not accept the ride sharing conditions on the input unit 205 such as a touch panel). When the user selects acceptance of the information indicating the above ride sharing conditions, the reservation registration unit F210 transmits the information indicating the selection result to the server apparatus 300. When such information is transmitted from both the user terminal 200 of the driver user and the user terminal 200 of the fellow passenger user to the server apparatus 300, an official combination of a driver user and a fellow passenger user is confirmed through a matching process in the server apparatus 300 as described above. Accordingly, reservation information corresponding to an official combination of a driver user and a fellow passenger user is transmitted from the server apparatus 300 to the user terminal 200. In that case, the reservation registration unit F210 displays the reservation information on the display unit 204. This allows the user of the user terminal 200 to confirm the reservation information. Note that the above function of the reservation registration unit F210 is implemented by the above predetermined application.

Here, the method for each user to have the above request information registered in the server apparatus 300 is not limited to the method using the user terminal 200. For example, the above request information may also be registered in the server apparatus 300 using an arbitrary terminal connectable to the network N1 (smartphone, mobile phone, tablet terminal, personal information terminal, wearable computer or the like) or a personal computer (PC).

When the user of the user terminal 200 assumes the position of the above first user, the contact request unit F220 receives the user's input of the above first information to the input unit 205 from the user and transmits the inputted first information to the server apparatus 300. When the user inputs the above first information, the contact request unit F220 may display the history of the reservation information corresponding to reservations made so far by the user on the display unit 204. In that case, the user of the user terminal 200 can select reservation information corresponding to the ride sharing between the first user and the second user from the history of reservation information displayed on the display unit 204 and select the seat position of the second user (or getting-on spot or getting-off spot) in the selected reservation information. The contact request unit F220 may generate first information as shown in aforementioned FIG. 10A based on the reservation ID of the user selected reservation information and the seat position information and transmit the generated first information to the server apparatus 300.

Here, when the above first information is transmitted to the server apparatus 300, the contact request unit F220 may attach the user's appearance image information to the first information. In that case, for example, the contact request unit F220 may perform a process of urging the user to select whether or not to attach the appearance image information to the first information when the first information is received (e.g., causing the input unit 205 such as a touch panel to display a button for selecting whether or not to attach the user's appearance image information). If the user selects to attach the appearance image information to the first information, the contact request unit F220 may activate a camera mounted on the user terminal 200 to pick up the user's appearance image and attach the captured appearance image information to the first information.

Note that the above function by the contact request unit F220 is implemented by the above predetermined application.

In the case where the user of the user terminal 200 assumes the position of the above second user, when the user terminal 200 receives the above second information transmitted from the server apparatus 300, the acceptance processing unit F230 displays the second information on the display unit 204 and performs a process of urging the second user to select whether or not to permit to provide the contact information to the first user (e.g., a process of displaying a button for selecting whether or not to permit to provide contact information on the input unit 205 such as a touch panel). When the second user selects whether or not to permit to provide the above contact information to the first user, the acceptance processing unit F230 generates third information as shown in aforementioned FIG. 10C based on the selection result and transmits the generated third information to the server apparatus 300. Note that the above function by the acceptance processing unit F230 is implemented by the above predetermined application.

(System Operation)

Operation of the ride-sharing system when the first user requests contact information will be described based on FIG. 12A to FIG. 12C. FIG. 12A is a flowchart illustrating an overview of a flow of data transmitted/received among respective components and a processing flow carried out by the respective components. FIG. 12B is a flowchart illustrating operation of the server apparatus 300 when the first information is received. FIG. 12C is a flowchart illustrating operation of the server apparatus 300 when the third information is received. Note that in the flow shown in FIG. 12A, suppose the first user and the second user are sharing or have a history of sharing the same vehicle 10.

In FIG. 12A, when the first user terminal 200A receives an input of the first information from the first user (step S11), the contact request unit F220 of the first user terminal 200A transmits the first information inputted to the first user terminal 200A to the server apparatus 300 (step S12). The first information referred to here is constructed of the contact request information, the reservation ID and the riding position information (or getting-on spot information or getting-off spot information of the second user) as shown in aforementioned FIG. 10A.

When the server apparatus 300 receives the first information transmitted from the first user terminal 200A, the information exchange processing unit F320 of the server apparatus 300 performs a process of generating second information (step S13) and a process of transmitting the generated second information to the second user terminal 200B (step S14). These processes are performed based on the processing flow as shown in FIG. 12B.

In FIG. 12B, when the server apparatus 300 receives the first information from the first user terminal 200A (step S101), the information exchange processing unit F320 of the server apparatus 300 performs a process of identifying the second user (step S102). More specifically, the information exchange processing unit F320 accesses the reservation management database D330 by using the reservation ID and the riding position information included in the above first information (or, getting-on spot information or getting-off spot information) as arguments, and thereby extracts a user ID of the second user as described above. Next, the information exchange processing unit F320 accesses the member information management database D340 by using the extracted user ID as an argument, and thereby identifies the member information table of the second user.

When the second user is identified in above step S102, the information exchange processing unit F320 generates second information (step S103). The second information referred to here is generated so as to include permission request information and user identification information as shown in aforementioned FIG. 10B. Next, the information exchange processing unit F320 transmits the second information generated in step S103 to the second user terminal 200B (step S104). In that case, the information exchange processing unit F320 acquires information necessary to communicate with the second user terminal 200B from the member information table of the second user identified in step S102 (electronic mail address of the second user terminal 200B) and transmits the second information generated in step S103 to the acquired electronic mail address.

Here, returning to FIG. 12A, when the second user terminal 200B receives the second information transmitted from the server apparatus 300, the acceptance processing unit F230 of the second user terminal 200B displays the user identification information included in the second information on the display unit 204 and executes a process of urging selection whether or not to permit to provide contact information to the first user (selection processing) (step S15). This allows the second user to determine whether or not to permit to provide contact information to the first user with reference to the user identification information relating to the first user. In that case, if appearance image information of the first user is included in the user identification information, the second user can determine more accurately which user among the other users sharing the same vehicle 10 is the first user. When the second user selects whether or not to permit to provide contact information to the first user on the second user terminal 200B, the acceptance processing unit F230 generates the third information as shown in aforementioned FIG. 10C based on the selection result. The acceptance processing unit F230 transmits the generated third information to the server apparatus 300 (step S16).

When the server apparatus 300 receives the third information transmitted from the second user terminal 200B, the information exchange processing unit F320 of the server apparatus 300 executes a process of determining whether or not to transmit contact information to the first user terminal 200A based on the third information (whether or not to provide contact information to the first user) (step S17) and a process of transmitting information corresponding to the determination result in step S17 to the first user terminal 200A (step S18). These processes are performed based on the processing flow shown in FIG. 12C.

In FIG. 12C, when the server apparatus 300 receives the third information transmitted from the second user terminal 200B (step S201), the information exchange processing unit F320 of the server apparatus 300 determines whether or not the third information is information permitting provision of contact information to the first user based on the answer type information included in the above third information (step S202).

Here, if the above third information is information permitting provision of contact information to the first user (affirmative determination in step S202), the information exchange processing unit F320 transmits the contact information to the first user terminal 200A (step S203). Information indicating a name to call the second user may be added to the contact information. When such contact information is transmitted to the first user terminal 200A, the first user can exchange information with the second user by contacting the second user based on the contact information.

On the other hand, if the above third information is information not permitting provision of contact information to the first user (negative determination in step S202), the information exchange processing unit F320 does not transmit the contact information to the first user terminal 200A, but transmits non-permission information to the first user terminal 200A (step S204). In this case, it is possible to prevent the first user from contacting the second user against the second user's will.

According to the above processing flow, when the first user requests provision of information (contact information) indicating the contact address of the second user who is sharing or has a history of sharing the same vehicle with the first user, the server apparatus 300 provides the above contact information to the first user on condition that the second user's consent is obtained. That is, the server apparatus 300 does not provide the above contact information to the first user unless the second user's consent is obtained. This prevents the first user from contacting the second user against the second user's will. As a result, it is possible to suitably intermediate information exchange between the users who are sharing or have a history of sharing the same vehicle 10.

<Modification 1 of First Embodiment>

Next, modification 1 of the aforementioned first embodiment will be described. Note that in the present modification, detailed description of components and control processes thereof substantially identical to those of the first embodiment will be omitted.

According to the aforementioned first embodiment, when the second user's consent is obtained, the server apparatus 300 basically provides only one type of contact information to the first user. In contrast, the present modification allows the second user to arbitrarily select the type of contact information provided from the server apparatus 300 to the first user. In that case, information specifying the type of contact information that can be provided to the first user may be included in the third information transmitted from the second user terminal 200B to the server apparatus 300. When the server apparatus 300 receives the third information permitting provision of the contact information to the first user, the server apparatus 300 may transmit the contact information of the type specified by the third information to the first user terminal 200A.

Here, when the second user terminal 200B transmits the third information to the server apparatus 300, the acceptance processing unit F230 of the second user terminal 200B performs a process of causing the second user to select the type of contact information that can be provided to the first user. For example, the acceptance processing unit F230 causes a touch panel 250A provided for the input unit 205 to display a screen as shown in FIG. 13. FIG. 13 is an example of a screen for selecting contact information that can be provided to the first user. In the example shown in FIG. 13, a button B1 for selecting "permit provision of electronic mail address and nickname," a button B2 for selecting "permit provision of electronic mail address and name," a button B3 for selecting "permit provision of electronic mail address and telephone number" and a button B4 for selecting "not permit provision of contact information" are displayed on the touch panel 250A and character information for urging selection of one of the four buttons B1 to B4 is displayed.

When the second user selects any one of the buttons B1 to B3 on the screen as shown in FIG. 13, the acceptance processing unit F230 may generate third information indicating permission to provide contact information of the type corresponding to the button selected by the second user. Here, a data configuration example of the third information in the present modification will be described based on FIG. 14. FIG. 14 is a diagram illustrating an example of a data configuration of the third information according to the present modification. The third information in the present modification is constructed of answer information, answer type information and contact type information. The answer information and the answer type information are similar to the third information shown in aforementioned FIG. 10C. Note that the answer type information is formed so as to display permission to provide contact information to the first user when the button B1 to B3 are selected in aforementioned FIG. 13 and display non-permission to provide contact information to the first user when the button B4 is selected in aforementioned FIG. 13. Furthermore, the contact type information is information specifying the type of contact information that can be provided to the first user when provision of contact information to the first user is permitted (when any one of the buttons B1 to B3 in FIG. 13 is selected). For example, when the button B1 in aforementioned FIG. 13 is selected, the contact type information is formed so as to specify "permit provision of electronic mail address and nickname." When the button B2 in aforementioned FIG. 13 is selected, the contact type information is formed so as to specify "permit provision of electronic mail address and name." When the button B3 in aforementioned FIG. 13 is selected, the contact type information is formed so as to specify "permit provision of electronic mail address and telephone number." Note that when provision of contact information to the first user is not permitted, the contact type information may be formed to become invalid information or the third information may be configured to include only the above answer information and answer type information.

Next, operation of the server apparatus 300 configured as described above when the third information is received will be described based on FIG. 15. In FIG. 15, processes similar to those in aforementioned FIG. 12C are assigned the same reference numerals.

In a processing flow in FIG. 15, when an affirmative determination is made in step S202, the information exchange processing unit F320 of the server apparatus 300 executes the processes in step S2031 and step S2032 instead of step S203 in aforementioned FIG. 12C.

In step S2031, the information exchange processing unit F320 generates contact information corresponding to the contact type information included in the third information. For example, if the above contact type information is information specifying "permit provision of electronic mail address and nickname," the information exchange processing unit F320 extracts the electronic mail address of the second user terminal 200B and the nickname of the second user from the member information table of the second user and generates contact information including those pieces of information. If the above contact type information is information specifying "permit provision of electronic mail address and name, the information exchange processing unit F320 extracts the electronic mail address of the second user terminal 200B and the second user's name from the member information table of the second user and generates contact information including those pieces of information. If the above contact type information is information specifying "permit provision of electronic mail address and telephone number, the information exchange processing unit F320 extracts the electronic mail address of the second user terminal 200B and the second user's telephone number from the member information table of the second user and generates contact information including those pieces of information.

In step S2032, the information exchange processing unit F320 transmits the contact information generated in above step S2031 to the first user terminal 200A.

According to the present modification, the second user can change the type of contact information provided to the first user according to an impression or the like received from the user identification information of the first user.

<Modification 2 of First Embodiment>

An example has been described in modification 1 of the aforementioned first embodiment where when provision of contact information to the first user is permitted, the second user specifies the type of contact information provided to the first user, whereas an example will be described in the present modification where the server apparatus 300 changes the type of contact information provided to the first user based on information relating to an evaluation of the first user.

FIG. 16 is a diagram illustrating a configuration example of a member information table according to the present modification 2. In the example shown in FIG. 16, the member information table is provided with an evaluation field in addition to the user ID field, the contact field, the attribute field, the authentication field and the vehicle ID field. Note that information registered in each field of the user ID field, the contact field, the attribute field, the authentication field and the vehicle ID field in the member information table in FIG. 15 is similar to that in the member information table shown in aforementioned FIG. 9. Information relating to an evaluation of each user by other user (sharing user) who is sharing or has a history of sharing the vehicle with the user is registered in the evaluation field. For example, "A" is registered in the evaluation field when an evaluation of each user by the sharing user is "good," "B" is registered when "average" and "C" is registered when "bad." Such evaluation information is derived by analyzing a tabulation result of evaluation information transmitted from the user terminal 200 of the sharing user who is sharing or has a history of sharing the vehicle with each user to the server apparatus 300 according to a known algorithm. Typical examples of the algorithm which can be illustrated include an algorithm that derives an evaluation representing the majority in a tabulation result of evaluation information of each user and an algorithm that derives an average evaluation of the above tabulation result.

Next, operation of the server apparatus 300 when third information is received in the present modification will be described based on FIG. 17. In FIG. 17, processes similar to those in aforementioned FIG. 12C are assigned the same reference numerals.

According to the processing flow in FIG. 17, when an affirmative determination is made in step S202, the information exchange processing unit F320 of the server apparatus 300 executes the processes in step S2033 and step S2034 instead of step S203 in aforementioned FIG. 12C.

In step S2033, the information exchange processing unit F320 generates contact information according to the evaluation information of the first user. For example, when the evaluation information registered in the evaluation field in the member information table of the first user is "C," the information exchange processing unit F320 extracts the electronic mail address of the second user terminal 200B and the nickname of the second user from the member information table of the second user and generates contact information including those pieces of information. When the evaluation information registered in the evaluation field in the member information table of the first user is "B," the information exchange processing unit F320 extracts the electronic mail address of the second user terminal 200B and the name of the second user from the member information table of the second user and generates contact information including those pieces of information. When the evaluation information registered in the evaluation field in the member information table of the first user is "A," the information exchange processing unit F320 extracts the electronic mail address of the second user terminal 200B, the name of the second user and the telephone number of the second user from the member information table of the second user and generates contact information including those pieces of information. Note that the method of executing the process of changing the type of contact information according to evaluation information of the first user is not limited to the above method, but, for example, the method may be configured such that the higher (better) the evaluation of the first user, the greater amount of information is included in the contact information.

In step S2034, the information exchange processing unit F320 transmits the contact information generated in step S2033 above to the first user terminal 200A.

According to the present modification, it is possible to change the type of contact information provided to the first user based on information relating to an evaluation of the first user by the sharing user who is sharing or has a history of sharing the vehicle with the first user.

<Modification 3 of First Embodiment>

Next, modification 3 of the aforementioned first embodiment will be described. Note that in the present modification, detailed description of components and control processes substantially identical to those of the first embodiment will be omitted.

An example has been described in the aforementioned first embodiment where when the server apparatus 300 receives the first information transmitted from the first user terminal 200A, the server apparatus 300 generates second information and immediately transmits the generated second information to the second user terminal 200B. In contrast, in the present modification, the server apparatus 300 transmits the second information to the second user terminal 200B at timing at which the first user and the second user cease the ride sharing. That is, at a point in time at which the server apparatus 300 receives the first information, if the first user and the second user are sharing the same vehicle 10, the server apparatus 300 delays transmission of the above second information until the first user and the second user cease to share the same vehicle 10 (a situation in which at least one of the first user and the second user gets off the vehicle 10).

Here, in the present modification, operation of the server apparatus 300 upon receiving the first information will be described based on FIG. 18. In FIG. 18, processes similar to those in aforementioned FIG. 12B are assigned the same reference numerals.

In the processing flow in FIG. 18, after the process in step S103 ends, the information exchange processing unit F320 of the server apparatus 300 executes processes in step S1041 and step S1042 instead of step S104 in aforementioned FIG. 12B.

In step S1041, the information exchange processing unit F320 determines whether or not the first user and the second user are sharing the same vehicle 10. For example, the information exchange processing unit F320 determines whether or not the first user and the second user are sharing the same vehicle 10 based on the information registered in the status field in the reservation information table corresponding to the reservation ID included in the first information (see aforementioned FIG. 7 and FIG. 8). Here, when both the first user and the second user are fellow passenger users, if "on board" is registered in both the status field of the first user and the status field of the second user, the information exchange processing unit F320 determines that the first user and the second user are sharing the same vehicle 10. When one of the first user and the second user is a driver user, if "on board" is registered in the status field of the fellow passenger user, the information exchange processing unit F320 determines that the first user and the second user are sharing the same vehicle 10. When the process in step S1041 is executed according to the above method, if it is determined that the first user and the second user are sharing the same vehicle 10 (affirmative determination in step S1041), the information exchange processing unit F320 executes the process in step S1041 over again. In that case, for example, timing at which the process in step S1041 is executed over again may be set after the scheduled getting-off date and time of the first user and/or the scheduled getting-off date and time of the second user in the reservation information table. On the other hand, when it is determined that the first user and the second user are not sharing the same vehicle 10 (negative determination in step S1041), the information exchange processing unit F320 proceeds to step S1042. In step S1042, the information exchange processing unit F320 transmits the second information generated in above step S103 to the second user terminal 200B.

According to the present modification, when the first user and the second user are sharing the same vehicle 10, even when the first information is transmitted from the first user terminal 200A to the server apparatus 300, the timing at which the second information is transmitted from the server apparatus 300 to the second user terminal 200B becomes timing after at least one of the first user and the second user gets off the vehicle 10. In this way, even when the second user does not want provision of contact information to the first user, the second user is more likely to feel less troublesomeness or less discomfort.

<Modification 4 of First Embodiment>

Next, modification 4 of the aforementioned first embodiment will be described. Note that in the present modification, detailed description of components and control processes substantially identical to those of the first embodiment will be omitted.

An example has been described in the aforementioned first embodiment where when the server apparatus 300 receives the first information transmitted from the first user terminal 200A, the server apparatus 300 transmits the second information to the second user terminal 200B regardless of whether or not there is a history of the second user having not permitted provision of contact information to the first user in the past. In contrast, in the present modification, in the case where there is a history of the second user having not provision of permitted contact information to the first user in the past, the server apparatus 300 transmits non-permission information to the first user terminal 200A without transmitting the second information to the second user terminal 200B. That is, if the first user who has a history of having not been permitted to receive provision of contact information in the past requests provision of contact information of the second user again, the server apparatus 300 side does not grant permission without executing any process of requesting permission from the second user so as to provide contact information to the first user.

Here, in the present modification, one configuration example of member information stored in the member information management database D340 will be described based on FIG. 19. FIG. 19 is a diagram illustrating a table configuration of member information according to the present modification.

The member information table shown in FIG. 19 includes a non-permission user field in addition to the fields of the user ID, the contact address, the attribute, the authentication and the vehicle ID. A user ID of another user not permitted to receive provision of contact information of each user in the past is registered in the non-permission user field. The information exchange processing unit F320 registers such a user ID when the server apparatus 300 receives third information not permitting provision of contact information to the other user. Note that for a user who has no history of receiving non-permission for provision of contact information to the other user, for example, "none" is registered in the non-permission user field.

Next, in the present modification, operation of the server apparatus 300 when first information is received will be described based on FIG. 20. In FIG. 20, processes similar to those in aforementioned FIG. 12B are assigned the same reference numerals.

In the processing flow in FIG. 20, after the process in step S102 ends, the information exchange processing unit F320 of the server apparatus 300 executes a process in step S1031 and a process in step S1032 or step S1033 instead of step S103 in aforementioned FIG. 12B.

In the process in step S1031, the information exchange processing unit F320 accesses the member information table of the second user identified in step S102 and determines whether or not the user ID of the first user is registered in the non-permission user field of the member information table. Here, if the user ID of the first user is not registered in the non-permission user field in the above member information table (negative determination in step 1031), the information exchange processing unit F320 proceeds to step S1032 and generates second information. The second information generated in step S1032 is transmitted to the second user terminal 200B (step S104). On the other hand, if the user ID of the first user is registered in the non-permission user field of the above member information table (affirmative determination in step S1031), the information exchange processing unit F320 transmits non-permission information to the first user terminal 200A without executing the processes in S1032 and S104 above (step S1033).

According to the present modification, when the first user not permitted to receive provision of contact information in the past requests provision of contact information of the second user over again, non-permission information is transmitted to the first user terminal 200A without requesting the second user to give permission to provide contact information to the first user. This makes it possible to reduce troublesomeness of the second user.

Second Embodiment

Next, a second embodiment of the present disclosure will be described. Note that in the present embodiment, detailed description of components and control processes substantially identical to those in the aforementioned first embodiment will be omitted.

An example will be described in the present embodiment where the present disclosure is implemented in a mode in which a plurality of users share the same workspace for the purpose of work. More specifically, a case will be described where the present disclosure is implemented in a mode in which a plurality of users work in the same workspace (hereinafter referred to as "space sharing").

(System Configuration)

FIG. 21 is a diagram illustrating a configuration example of a system for providing a space sharing service (hereinafter may be referred to as "space sharing system"). In the example shown in FIG. 21, the space sharing system is constructed of a workspace 50 used as a work space that can be shared among a plurality of users, user terminals 600 used by users who use the workspace 50 and a server apparatus 700. The user terminals 600 and the server apparatus 700 are mutually connectable via a network N2. A configuration of the network N2 is similar to the configuration of the network N1 according to the aforementioned first embodiment.

Note that although only one workspace 50 is shown as the workspace in the example shown in FIG. 21, suppose that the same number of workspaces as the spaces available in the space sharing service are included in the space sharing system. Furthermore, in the example shown in FIG. 21, although only two user terminals 600: a first user terminal 600A used by a first user and a second user terminal 600B used by a second user who is sharing or has a history of sharing the same workspace with the first user, are illustrated, suppose that the space sharing system includes the same number of user terminals 600 as the users registered as members entitled to use the space sharing service.

Each user terminal 600 has a predetermined application for using the space sharing service installed. The user of each user terminal 600 causes the own user terminal 600 to execute the above predetermined application, and can thereby have information relating to conditions or the like to use the workspace (request information) registered in the server apparatus 700. For example, each user causes the own user terminal 600 to execute the above predetermined application, and can thereby have information relating to the location of a workspace desired by the user and a rental period or the like registered in the server apparatus 700 as the request information. Note that details of the user terminal 600 will be described later.

The server apparatus 700 receives request information from each user. The server apparatus 700 then performs a workspace rental process for each user based on the request information from each user. For example, the server apparatus 700 provisionally determines a workspace suited to a condition desired by each user based on the request information from each user. The server apparatus 700 transmits information relating to use conditions of the provisionally determined workspace to the user terminal 600. Upon receiving information accepting the workspace use conditions from the user terminal 600, the server apparatus 700 confirms the provisionally determined workspace as an official workspace for rent.

Furthermore, in addition to the function of performing the above rental process, the server apparatus 700 of the present embodiment also has a function of intermediating information exchange among users who are sharing or have a history of sharing the same workspace. Here, in a case where the first user and the second user whose contact addresses are unknown to each other share the same workspace, the first user may want to exchange information with the second user. That is, the first user may want to provide contact information indicating the contact address of the second user to be provided. Thus, in the present embodiment, when the server apparatus 700 receives information requesting provision of the contact information (first information) transmitted from the first user terminal 600A, the server apparatus 700 transmits information requesting permission to provide the contact information to the first user (second information) to the second user terminal 600B. When the server apparatus 700 receives information (third information) indicating whether or not to permit to provide the contact information to the first user transmitted from the second user terminal 600B in response to the above second information, if the third information is information permitting to provide the contact information to the first user, the server apparatus 700 transmits the contact information to the first user terminal 600A. On the other hand, if the third information is information not permitting to provide the contact information to the first user, the server apparatus 700 does not transmit the contact information to the first user terminal 600A, but transmits non-permission information to the first user terminal 600A. In the present embodiment, the server apparatus 700 having the function of intermediating information exchange among users who are sharing or have a history of sharing the same workspace corresponds to the "information processing apparatus" according to the present disclosure.

Note that since hardware configurations of the user terminal 600 and the server apparatus 700 in the present embodiment are similar to the hardware configurations of the user terminal 200 and server apparatus 300 of the aforementioned first embodiment, description thereof will be omitted.

(Functional Configuration of Server Apparatus)

Here, a functional configuration of the server apparatus 700 in the present embodiment will be described based on FIG. 22. As shown in FIG. 22, the server apparatus 700 in the present embodiment includes, as functional components thereof, a rental processing unit F710, an information exchange processing unit F720, a workspace management database D710, a rental management database D720 and a member information management database D730. Here, the rental processing unit F710 and the information exchange processing unit F720 are formed by a processor of the server apparatus 700 executing a computer program in a main storage unit. Any one or part of the rental processing unit F710 and the information exchange processing unit F720 may be formed of a hardware circuit.

The workspace management database D710, the rental management database D720 and the member information management database D730 are constructed by a program of a database management system executed by the processor of the server apparatus 700 managing data stored in an auxiliary storage unit. These workspace management database D710, rental management database D720 and member information management database D730 are, for example, relational databases.

Note that any one of the respective functional components of the server apparatus 700 or part of the processing thereof may be executed by another computer connected to the network N2. For example, each process included in the rental processing unit F710 and each process included in the information exchange processing unit F720 may be executed by different computers.

The workspace management database D710 stores information relating to a workspace available in the space sharing service, which associates identification information of each workspace with information indicating an attribute of each workspace. One configuration example of the workspace information stored in the workspace management database D710 will be described based on FIG. 23. FIG. 23 is a diagram illustrating a table configuration of workspace information. Note that information registered in the workspace information table is not limited to the example shown in FIG. 23, but fields can be added, changed or deleted as appropriate.

The workspace information table shown in FIG. 23 includes fields such as a space ID, a location, a rentable period and a status. A space ID which is information for identifying each workspace available for space sharing is registered in the space ID. The space ID referred to here is information assigned when a space sharing service provider registers a workspace available for a space sharing service. Information indicating a location of each workspace is registered in the location field. Information indicating a period during which each workspace is rentable is registered in the rentable period field. Information indicating a rental situation of each workspace is registered in the status field. For example, "expired" is registered for a workspace whose rental period has expired, "being rented out" is registered for a workspace in the middle of a rental period and "reserved" is registered for a workspace in a stage prior to a rental period. Information registered in the status field is successively updated by the space sharing service provider.

The rental management database D720 stores rental information for users who want to rent an arbitrary workspace, where each user is associated with information relating to a workspace to be rented out to each user. One configuration example of rental information stored in the rental management database D720 will be described based on FIG. 24. FIG. 24 is a diagram illustrating a table configuration of rental information. Note that the information registered in the rental information table is not limited to the example shown in FIG. 24, but fields can be added, changed or deleted as appropriate.

The rental information table shown in FIG. 24 includes fields such as a rental ID, a user ID, a space ID, a rental period, user identification information, and a status. A rental ID which is information for identifying individual rental information is registered in the rental ID field. This rental ID is used to confirm or change rental information reserved by each user. A user ID of a user who made a reservation for renting each workspace is registered in the user ID field. A space ID of a workspace to be rented out to each user is registered in the space ID field. Information indicating a period during which a workspace is rented out to each user is registered in the rental period field. Identification information assigned from the workspace provider to each user when each user uses the workspace is registered in the user identification information field. Such identification information is information necessary for the workspace provider or sharing user to identify each user and is, for example, a number or symbol described in an identification certificate or the like or information indicating a seat position provided when each user uses the workspace. Information indicating a situation of each rental information is registered in the status field. For example, "expired" is registered when a rental period during which a workspace is rented out to the user has expired, "being rented out" is registered when the workspace is being rented out to the user and "reserved" is registered when the workspace is in a stage prior to a rental period for the user.

The member information management database D730 stores information on a user who is registered in the space sharing service as a member (member information). One configuration example of the member information stored in the member information management database D730 will be described based on FIG. 25. FIG. 25 is a diagram illustrating a table configuration of member information. Note that the information registered in the member information table is not limited to the example shown in FIG. 25, but fields can be added, changed or deleted as appropriate.

The member information table shown in FIG. 25 includes fields such as a user ID, a contact address, an attribute and authentication. A user ID assigned when each user applies for registration in a space sharing service as a member is registered in the user ID field. Note that information registered in the contact field, the attribute field and the authentication field is substantially identical to the member information table according to the aforementioned first embodiment (see aforementioned FIG. 9).

Next, the rental processing unit F710 receives request information from the user who is registered in the space sharing service as a member and performs a rental process on a workspace suited to the request information. More specifically, when the server apparatus 700 receives request information transmitted from the user terminal 600, the rental processing unit F710 accesses the workspace management database D710 and performs a rental process on the workspace matching the above request information. For example, the rental processing unit F710 extracts workspaces located within a location region specified by the above request information and rentable during a rental period specified by the above request information from among a plurality of workspaces registered in the workspace management database D710. Information relating to use conditions of the workspaces extracted in such a procedure (e.g., network environment, available equipment, and usage rules for the workspaces) is transmitted from the server apparatus 700 to the user terminal 600 in the form of a reply to the above request information. Upon receiving information consenting the above workspace use conditions from the user terminal 600, the rental processing unit F710 generates a rental information table as shown in aforementioned FIG. 24 for the workspace extracted in the above procedure, stores the generated rental information table in the rental management database D720 and transmits a rental ID of the generated rental information table to the user terminal 600. Note that the method of executing the rental process by the rental processing unit F710 is not limited to the above method, but the rental process can be executed according to another method using a known technique.

Furthermore, when the server apparatus 700 receives first information transmitted from the user terminal (first user terminal 600A) of the user (first user) using the space sharing service, the information exchange processing unit F720 performs a predetermined information exchange process.

As described above, the first information according to the present embodiment is information requesting provision of contact information (information indicating the contact address of a specific sharing user (second user) who is sharing or has a history of sharing the same workspace with the first user). Here, a data configuration of the first information according to the present embodiment will be described based on FIG. 26. FIG. 26 is a diagram schematically illustrating an example of a data configuration of the first information. The first information according to the present embodiment is basically constructed of contact request information, a rental ID and user identification information, and is configured such that appearance image information can be added as required. Note that the contact request information and the appearance image information are substantially identical to the first information in the aforementioned first embodiment (see aforementioned FIG. 10A). Furthermore, the rental ID is a rental ID of the workspace shared by the first user with the second user and corresponds to the "space identification information" according to the present disclosure. The user identification information is user identification information of the second user when the first user and the second user share the same workspace and corresponds to the "second user identification information" according to the present disclosure. Note that the space identification information included in the first information is not limited to the rental ID as shown in FIG. 26, but it is possible to use at least one of the space ID of a workspace which is being shared or which has been shared between the first user and the second user, information indicating a rental period of the first user when the first user and the second user are sharing or have shared the same workspace and user identification information of the first user when the first user and the second user are sharing or have shared the same workspace. In short, the space identification information included in the first information may be information capable of identifying a workspace which is being shared or which has been shared between the first user and the second user.

Furthermore, the predetermined information exchange process in the present embodiment is a process of providing the above contact information to the first user exclusively when the consent of the second user for provision of the above contact information to the first user can be obtained. Hereinafter, the predetermined information exchange process according to the present embodiment will be described.

In the above predetermined information exchange process of the present embodiment, the information exchange processing unit F720 performs a process of identifying the second user first. More specifically, the information exchange processing unit F720 accesses the rental management database D720 by using the rental ID included in the first information as an argument to thereby identify a rental information table corresponding to the rental ID. The workspace which is being shared or which has been shared between the first user and the second user is thereby identified. Note that instead of the rental ID, when the first information includes as space identification information, at least one of a space ID of a workspace which is being shared or which has been shared between the first user and the second user, information indicating a rental period of the first user when the first user and the second user are sharing or have shared the workspace and user identification information of the first user when first user and the second user are sharing or have shared the workspace, it is only necessary to identify a rental information table in which information matching the above space identification information is registered from among rental information tables stored in the rental management database D720. Next, the information exchange processing unit F720 extracts a space ID registered as a space ID in the identified rental information table. Next, the information exchange processing unit F720 identifies a rental information table in which the same ID as the extracted space ID is registered in the space ID field and the same information as the user identification information included in the first information is registered in the user identification information field from among a plurality of rental information tables stored in the rental management database D720. Next, the information exchange processing unit F720 extracts a user ID registered in the user ID field of the identified rental information table. The information exchange processing unit F720 then accesses the member information management database D730 by using the extracted user ID as an argument to thereby identify a member information table corresponding to the user ID. The second user who is sharing or has a history of sharing the same workspace with the first user is thereby identified.

When the second user is identified in the above procedure, the information exchange processing unit F720 performs a process of requesting the second user to permit to provide contact information to the first user. First, the information exchange processing unit F720 acquires information necessary to communicate with the second user terminal 600B (e.g., electronic mail address of the second user terminal 600B) from the information registered in the contact field in the member information table of the second user. Next, the information exchange processing unit F720 transmits second information to the acquired electronic mail address. The "second information" referred to here is information requesting permission to provide the above contact information to the first user and is constructed of permission request information and user identification information as in the case of the second information (see aforementioned FIG. 10B) in the aforementioned first embodiment. However, the user identification information in the present embodiment is formed of at least one of attribute information of the first user, user identification information of the first user when the first user and the second user share the same workspace and appearance image information of the first user. The user identification information of the first user when the first user and the second user share the same workspace is extracted from the rental information table corresponding to the rental ID in the first information.

After the second information configured as described above is transmitted from the server apparatus 700 to the second user terminal 600B, if the server apparatus 700 receives third information transmitted from the second user terminal 600B in response to the second information, the information exchange processing unit F720 determines whether or not to transmit contact information to the first user terminal 600A based on the third information. Note that the "third information" referred to here is information permitting or not permitting to provide contact information to the first user and is substantially identical to the third information (see aforementioned FIG. 10C) in the aforementioned first embodiment. Therefore, the information exchange processing unit F720 determines whether or not to transmit contact information to the first user terminal 600A based on the answer type information included in the third information in the present embodiment as well. When the above answer type information is information permitting provision of contact information to the first user, the information exchange processing unit F720 transmits the above contact information to the first user terminal 600A. On the other hand, when the above answer type information is information not permitting provision of contact information to the first user, the information exchange processing unit F720 does not transmit the above contact information to the first user terminal 600A, but transmits non-permission information to the first user terminal 600A.

(Functional Configuration of User Terminal)

FIG. 27 is a diagram illustrating a functional configuration of the user terminal 600. The user terminal 600 is provided with a reservation registration unit F610, a contact request unit F620 and an acceptance processing unit F630 as functional components. These reservation registration unit F610, contact request unit F620 and acceptance processing unit F630 are formed by the processor of the user terminal 600 by executing a computer program in the main storage unit. Note that any one of the above functional components or part of the processing thereof may be executed by a hardware circuit.

The reservation registration unit F610 receives an input of request information from the user and transmits the inputted request information to the server apparatus 700. In the present example, information specifying a workspace location and a rental period or the like is inputted as request information. When information relating to the use conditions of the workspace provisionally determined in response to the above request information is transmitted from the server apparatus 700 to the user terminal 600, the reservation registration unit F610 displays information relating to the above use conditions on a display unit of the user terminal 600. When the user performs operation of accepting the above use conditions on the user terminal 600, the reservation registration unit F610 transmits information indicating the acceptance of the above use conditions to the server apparatus 700. Note that the above function by the reservation registration unit F610 is implemented by the above predetermined application.

When the user of the user terminal 600 assumes the position of the above first user, the contact request unit F620 receives the input of the above first information by the user and transmits the inputted first information to the server apparatus 700. In that case, the contact request unit F620 may attach the user's appearance image information to the first information. Note that the above function by the contact request unit F620 is implemented by the above predetermined application.

When the user of the user terminal 600 assumes the position of the above second user, if the user terminal 600 receives the above second information transmitted from the server apparatus 700, the acceptance processing unit F630 displays the second information on the display unit and performs a process of urging selection of whether or not to permit provision of contact information to the first user. When the operation of selecting whether or not to permit provision of contact information to the first user is performed on the user terminal 600, the acceptance processing unit F630 generates third information corresponding to the selection result and transmits the generated third information to the server apparatus 700. Note that the above function by the acceptance processing unit F630 is implemented by the above predetermined application.

The operation of the space sharing system when the first user requests contact information and the operation of the server apparatus 700 is substantially identical to the operation of the ride-sharing system in the aforementioned first embodiment (see aforementioned FIG. 12A to FIG. 12C). Therefore, when the first user requests provision of information indicating the contact address of the second user who is sharing or has a history of sharing the same workspace with the first user (contact information), the server apparatus 700 provides the above contact information to the first user on condition that the consent of the second user is obtained. That is, the server apparatus 700 does not provide the above contact information to the first user unless the consent of the second user is obtained. This prevents the first user from contacting the second user against the second user's will. As a result, it is possible to suitably intermediate information exchange between the users who are sharing or have a history of sharing the same workspace.

<Modification 1 of Second Embodiment>

According to the aforementioned second embodiment, when the second user's consent is obtained, the server apparatus 700 basically provides only one type of contact information to the first user, but as mentioned in modification 1 of the aforementioned first embodiment, contact information of a type arbitrarily specified by the second user may be provided to the first user. In that case, the second user can change the type of contact information provided to the first user according to an impression or the like received from the information for identifying the first user.

<Modification 2 of Second Embodiment>

According to the aforementioned second embodiment, when the second user's consent is obtained, the server apparatus 700 basically provides only one type of contact information to the first user, but as mentioned in modification 2 of the aforementioned first embodiment, the server apparatus 700 may change the type of contact information provided to the first user based on information relating to an evaluation of the first user by the sharing user who is sharing or has a history of sharing the same workspace with the first user as described in modification 2 of the aforementioned first embodiment.

<Modification 3 of Second Embodiment>

An example has been described in the aforementioned second embodiment where when the server apparatus 700 receives first information transmitted from the first user terminal 600A, the server apparatus 700 generates second information and immediately transmits the generated second information to the second user terminal 600B. In contrast, the server apparatus 700 may transmit the second information to the second user terminal 600B at timing at which sharing of the workspace by the first user and the second user ends. That is, at a point in time at which the server apparatus 700 receives the first information, if the first user and the second user are sharing the same workspace, the server apparatus 700 may delay transmission of the above second information until the sharing of the same workspace by the first user and the second user ends. In that case, the server apparatus 700 may determine whether or not the first user and the second user are sharing the same workspace based on the information registered in the status field of the rental information table corresponding to the first user and the information registered in the status field of the rental information table corresponding to the second user.

<Modification 4 of Second Embodiment>

An example has been described in the aforementioned second embodiment where when the server apparatus 700 receives first information transmitted from the first user terminal 600A, the server apparatus 700 transmits second information to the second user terminal 600B regardless of whether or not there is a history of the second user having not permitted provision of contact information to the first user in the past. In contrast, as mentioned in modification 4 of the aforementioned first embodiment, if there is a history of the second user having not permitted provision of contact information to the first user in the past, the server apparatus 700 may not transmit the second information to the second user terminal 600B, but may transmit non-permission information to the first user terminal 600A.

<Modification 5 of Second Embodiment>

An example has been described in the aforementioned second embodiment where in a mode in which a plurality of users share the same workspace for the purpose of work, the present disclosure is applied to a server apparatus managed by a space sharing service provider, but the present disclosure is also applicable to a server apparatus managed by an administrator of each session in a mode in which a plurality of users share the same venue for a seminar for the purpose of attending a seminar or a mode in which a plurality of users share the same venue for a study session for the purpose of study.

<Others>

The above embodiments are merely examples and the present disclosure can be changed and implemented as appropriate without departing from the spirit and scope of range of the disclosure.

The processes and means described in the present disclosure may be freely combined and implemented unless there are technical inconsistencies. A process described as being performed by one device may be shared and executed among a plurality of devices. Alternatively, processes described as being executed by different devices may be executed by one device. In a computer system, it is possible to flexibly change a hardware configuration used to implement each function.

Furthermore, the present disclosure can also be implemented by supplying a computer program including the functions described in the above embodiments to a computer and by one or more processors included in the computer reading and executing the program. Such a computer program may be supplied to the computer through a non-transitory computer readable storage medium which is connectable to a system bus of the computer or may be supplied to the computer via a network. The non-transitory computer readable storage medium is a storage medium which allows information such as data or a program to be stored through electrical, magnetic, optical, mechanical or chemical action and read from the computer or the like, and examples of such a medium include any type of disk such as magnetic disk (floppy (registered trademark) disk, hard disk drive (HDD) or the like), optical disk (CD-ROM, DVD disk, blue-ray disk or the like), read-only memory (ROM), random access memory (RAM), EPROM, EEPROM, magnetic card, flash memory, optical card and SSD (Solid State Drive).

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing apparatus comprising:
a memory configured to store information relating to sharing users who are users sharing or having a history of sharing a predetermined space with a first user, the memory including:
   a first database configured to store user identification information of the sharing users and user IDs of the sharing users such that the user identification information and the user IDs are associated with space identification information, and
   a second database configured to store, for each user ID, a table in which contact information necessary to communicate with user terminal of the sharing users is associated with the user ID; and
a controller configured to execute:
   receiving first information requesting provision of contact information indicating a contact address of a second user, the first information including space identification information and second user identification information, the first information being transmitted from a first user terminal, which is a terminal used by the first user;
   identifying the second user by executing:
      accessing the first database and acquiring the user ID of the second user from the user IDs of the sharing users by using the space identification information and the second user identification information included in the first information, and
      using the user ID of the second user to access the second database to identify the table which stores the contact information of the second user, and
   transmitting, to a second user terminal used by the second user, second information which is information requesting permission to provide the contact information to the first user, the second information including information to identify the first user.

2. The information processing apparatus according to claim 1, wherein the controller is further configured to execute:
   receiving, from the second user terminal, third information transmitted from the second user terminal in response to the second information, which is information permitting or not permitting provision of the contact information to the first user; and
   transmitting the contact information to the first user terminal when the third information is information permitting provision of the contact information to the first user, and transmitting non-permission information which is information indicating that provision of the contact information is not permitted to the first user terminal when the third information is information not permitting provision of the contact information to the first user.

3. The information processing apparatus according to claim 2, wherein when the first information transmitted from the first user terminal is received, and the first user and the second user are sharing the predetermined space, the controller transmits the second information to the second user terminal after sharing of the predetermined space by the first user and the second user ends.

4. The information processing apparatus according to claim 2, wherein:
   the predetermined space is a riding space of a vehicle to be shared among a plurality of users for a traveling purpose,
   the space identification information is information for the first user to identify the vehicle,
   the second user identification information is information indicating a riding position of the second user in the vehicle, and
   when the first information transmitted from the first user terminal is received, the controller identifies the second user in such a way that the controller accesses the memory by using the space identification information and the second user identification information included in the first information, thereby acquiring information necessary to communicate with the second user terminal and transmitting the second information to the second user terminal by using the acquired information.

5. The information processing apparatus according to claim 2, wherein:
   the predetermined space is a workspace to be shared among a plurality of users for a work purpose,
   the space identification information is information for the first user to identify the workspace,
   the second user identification information is identification information given from a provider of the workspace to the second user, and
   when the first information transmitted from the first user terminal is received, the controller identifies the second user in such a way that the controller accesses the memory by using the space identification information and the second user identification information included in the first information, thereby acquiring information necessary to communicate with the second user terminal and transmitting the second information to the second user terminal using the acquired information.

6. The information processing apparatus according to claim 2, wherein the information to identify the first user included in the second information includes at least one of attribute information of the first user and image information obtained by capturing up an image of an appearance of the first user.

7. The information processing apparatus according to claim 2, wherein:
   when the third information is information permitting provision of the contact information to the first user, the third information includes information specifying a type of the contact information provided to the first user, and
   the controller changes the type of the contact information provided to the first user in accordance with the information specifying the type of the contact information provided to the first user included in the third information.

8. The information processing apparatus according to claim 2, wherein when the third information is information permitting provision of the contact information to the first user, the controller changes a type of the contact information provided to the first user based on information on an evaluation of the first user by a user other than the first user.

9. The information processing apparatus according to claim 2, wherein when the first information is received from the first user terminal again after the non-permission information is transmitted to the first user terminal, the controller does not transmit the second information to the second user terminal, and transmits the non-permission information to the first user terminal.

10. An information processing method configured to cause a computer to execute:
a step of receiving first information requesting provision of contact information indicating a contact address of a second user, the first information including space identification information and second user identification information, the first information being transmitted from a first user terminal, which is a terminal used by a first user;

a step of identifying the second user by executing:

accessing a memory configured to store information relating to sharing users who are users sharing or having a history of sharing a predetermined space with the first user, the memory including:

a first database configured to store user identification information of the sharing users and user IDs of the sharing users such that the user identification information and the user IDs are associated with space identification information, and a second database configured to store, for each user ID, a table in which contact information necessary to communicate with a user terminal of the sharing users is associated with the user ID; and accessing the first database and acquiring the user ID of the second user from the user IDs of the sharing users by using the space identification information and the second user identification information included in the first information, and using the user ID of the second user to access the second database to identify the table which stores the contact information of the second user; and a step of transmitting, to a second user terminal used by the second user, second information which is information requesting permission to provide the contact information to the first user and which includes information to identify the first user.

11. A non-transitory storage medium storing an information processing program configured to cause a computer to execute:

a step of receiving first information requesting provision of contact information indicating a contact address of a second user, the first information including space identification information and second user identification information, the first information being transmitted from a first user terminal, which is a terminal used by a first user;

a step of identifying the second user by executing:

accessing a memory configured to store information relating to sharing users who are users sharing or having a history of sharing a predetermined space with the first user, the memory including:

a first database configured to store user identification information of the sharing users and user IDs of the sharing users such that the user identification information and the user IDs are associated with space identification information, and a second database configured to store, for each user ID, a table in which contact information necessary to communicate with a user terminal of the sharing users is associated with the user ID; and accessing the first database and acquiring the user ID of the second user from the user IDs of the sharing users by using the space identification information and the second user identification information included in the first information, and using the user ID of the second user to access the second database to identify the table which stores the contact information of the second user; and a step of transmitting, to a second user terminal used by the second user, second information which is information requesting permission to provide the contact information to the first user and which includes information to identify the first user.

* * * * *